US009576441B2

(12) United States Patent
Kitamura et al.

(10) Patent No.: US 9,576,441 B2
(45) **Date of Patent: *Feb. 21, 2017**

(54) GAMING MACHINE HAVING NORMAL GAME MODE AND CHANCE GAME MODE

(71) Applicants: Universal Entertainment Corporation, Tokyo (JP); Aruze Gaming America, Inc., Las Vegas, NV (US)

(72) Inventors: Kenta Kitamura, Tokyo (JP); Tatsuya Teranishi, Tokyo (JP); Masumi Fujisawa, Tokyo (JP)

(73) Assignees: UNIVERSAL ENTERTAINMENT CORPORATION, Tokyo (JP); ARUZE GAMING AMERICA, INC., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/740,364

(22) Filed: Jun. 16, 2015

(65) Prior Publication Data

US 2015/0279167 A1 Oct. 1, 2015

Related U.S. Application Data

(63) Continuation of application No. 13/868,206, filed on Apr. 23, 2013, now Pat. No. 9,087,439.

(30) Foreign Application Priority Data

May 10, 2012 (JP) ................................ 2012-108157

(51) Int. Cl.

| | |
|---|---|
| *A63F 9/24* | (2006.01) |
| *A63F 13/00* | (2014.01) |
| *G06F 17/00* | (2006.01) |
| *G06F 19/00* | (2011.01) |
| *G07F 17/34* | (2006.01) |
| *G07F 17/32* | (2006.01) |

(52) U.S. Cl.
CPC ............ *G07F 17/34* (2013.01); *G07F 17/326* (2013.01); *G07F 17/3213* (2013.01)

(58) Field of Classification Search
CPC ................................................ G07F 17/3267
See application file for complete search history.

(56) References Cited

U.S. PATENT DOCUMENTS

| | | | |
|---|---|---|---|
| 4,097,048 | A | 6/1978 | Poulsen |
| 4,508,345 | A | 4/1985 | Okada |
| 7,871,327 | B2 | 1/2011 | Walker |
| 7,942,733 | B2 | 5/2011 | Sakuma |

*Primary Examiner* — Kevin Y Kim
(74) *Attorney, Agent, or Firm* — LEW IP MEISTER, PLLC

(57) ABSTRACT

The present invention provides a gaming machine which can provide games that are prevented from progressing monotonously and thus can provide a player with a feeling of tension, thereby facilitating the consumption of more gaming media. A currently played chance game is discontinued and the chance game is started afresh from the first game under the condition that a second symbol appears on a symbol display unit upon the number of games being less than a predetermined number in the chance game mode.

4 Claims, 22 Drawing Sheets

SYMBOL CODE TABLE

FIG 11

SYMBOL CODE DETERMINATION TABLE 340 341 342 343

| RANDOM NUMBER | SYMBOL CODE |
|---|---|
| 0 – ULIMIT0 | 00 |
| LLIMIT01 – ULIMIT01 | 01 |
| LLIMIT02 – ULIMIT02 | 02 |
| LLIMIT03 – ULIMIT03 | 03 |
| LLIMIT04 – ULIMIT04 | 04 |
| LLIMIT05 – ULIMIT05 | 05 |
| LLIMIT06 – ULIMIT06 | 06 |
| LLIMIT07 – ULIMIT07 | 07 |
| LLIMIT08 – ULIMIT08 | 08 |
| LLIMIT09 – ULIMIT09 | 09 |
| LLIMIT10 – ULIMIT10 | 10 |

FIG. 12

| RANDOM NUMBER | | | | | | | SYMBOL CODE |
|---|---|---|---|---|---|---|---|
| NORMAL GAME | NORMAL GAME | ••• | CHANCE GAME | CHANCE GAME | ••• | CHANCE GAME | |
| COL NO.1 | COL NO.2 | ••• | COL NO.1 | COL NO.2 | ••• | COL NO.5 | |
| 0 – XXX | 0 – XXX | ••• | 0 – XXX | 0 – XXX | ••• | 0 – XXX | 00 |
| XXX – XXX | XXX – XXX | ••• | XXX – XXX | XXX – XXX | ••• | XXX – XXX | 01 |
| XXX – XXX | XXX – XXX | ••• | XXX – XXX | XXX – XXX | ••• | XXX – XXX | 02 |
| XXX – XXX | XXX – XXX | ••• | XXX – XXX | XXX – XXX | ••• | XXX – XXX | 03 |
| XXX – XXX | XXX – XXX | ••• | XXX – XXX | XXX – XXX | ••• | XXX – XXX | 04 |
| XXX – XXX | XXX – XXX | ••• | XXX – XXX | XXX – XXX | ••• | XXX – XXX | 05 |
| XXX – XXX | XXX – XXX | ••• | XXX – XXX | XXX – XXX | ••• | XXX – XXX | 06 |
| XXX – XXX | XXX – XXX | ••• | XXX – XXX | XXX – XXX | ••• | XXX – XXX | 07 |
| XXX – XXX | XXX – XXX | ••• | XXX – XXX | XXX – XXX | ••• | XXX – XXX | 08 |
| XXX – XXX | XXX – XXX | ••• | XXX – XXX | XXX – XXX | ••• | XXX – XXX | 09 |
| XXX – XXX | XXX – XXX | ••• | XXX – XXX | XXX – XXX | ••• | XXX – XXX | 10 |

FIG. 14

PAYOUT TABLE 380
381
383

| SYMBOL | PAYOUT | PROBABILITY |
|---|---|---|
| [BAR BAR BAR] [BAR BAR BAR] [BAR BAR BAR] [BAR BAR BAR] [BAR BAR BAR] | 120 | 1 / 152,043 |
| [BAR BAR BAR] [BAR BAR BAR] [BAR BAR BAR] [BAR BAR BAR] | 60 | 1 / 21,481 |
| [BAR BAR BAR] [BAR BAR BAR] [BAR BAR BAR] | 30 | 1 / 537 |
| [BAR BAR] [BAR BAR] [BAR BAR] [BAR BAR] [BAR BAR] | 90 | 1 / 20,041 |
| [BAR BAR] [BAR BAR] [BAR BAR] [BAR BAR] | 45 | 1 / 4,163 |
| [BAR BAR] [BAR BAR] [BAR BAR] | 15 | 1 / 172 |
| BAR BAR BAR BAR BAR | 60 | 1 / 18,415 |
| BAR BAR BAR BAR | 30 | 1 / 2,185 |
| BAR BAR BAR | 12 | 1 / 101 |
| ANY BAR ANY BAR ANY BAR ANY BAR ANY BAR | 15 | 1 / 146 |
| ANY BAR ANY BAR ANY BAR ANY BAR | 6 | 1 / 96 |
| ANY BAR ANY BAR ANY BAR | 3 | 1 / 8 |
|  | 60 | 1 / 1,560,048,480 |
|  | 30 | 1 / 4,369,884 |
|  | 15 | 1 / 31,144 |
|  | 6 | 1 / 454 |
|  | 3 | 1 / 14 |
|  | 1000 | 1 / 10415 |
|  | 300 | 1 / 1037 |
|  | 200 | 1 / 494 |

GAMING MACHINE HAVING NORMAL GAME MODE AND CHANCE GAME MODE

CROSS REFERENCE TO RELATED APPLICATIONS

This application is a Continuation Application of U.S. patent application Ser. No. 13/868,206 filed on Apr. 23, 2013, which claims priority of Japanese Patent Application No. 2012-108157 filed on May 10, 2012. The contents of this application are incorporated herein by reference in their entirety.

BACKGROUND OF THE INVENTION

1. Field of the Invention

The present invention relates to a gaming machine and, more particularly, to a gaming machine which rearranges symbols in each of unit games and awards a benefit when a winning pattern is established in the rearranged symbols.

2. Description of the Related Art

A slot machine is a gaming machine that rotates reels to rearrange symbols in a display area each time a game player presses a button located on a control panel to start playing a unit game. When a winning pattern is formed in the display area, a benefit (e.g., a payout) is awarded to the player (for example, refer to U.S. Pat. No. 4,097,048).

In consideration of players' diversified preferences, there have been developed a variety of slot machines. For example, the slot machines has been developed which varies in symbol patterns, gaming scenarios, side effects (sound effects, effects using images, and effects by means of reel spinning). Moreover, the slot machine has been developed which is provided with a bonus game (for example, refer to U.S. Pat. No. 4,508,345). Furthermore, the slot machine also has been developed which permits the enjoyment of a free game under predetermined conditions (for example, refer to U.S. Pat. No. 7,942,733).

Furthermore, there also have been developed the slot machine that allows the player to access television program, web sites, or pay-per-view services (for example, refer to U.S. Pat. No. 7,871,327).

Yet further, there has been conventionally a gaming machine which adds further free games when a predetermined condition is established in a free game mode. This enables a player to play extra free games in a row, and thus more benefits have been able to given to a player.

SUMMARY OF THE INVENTION

However, since extra free games are added each time the predetermined condition is established, the number of free games resultingly increases. Thus, the games proceed monotonously, which undermines a player's feeling of tension and makes a player bored in the meantime. Furthermore, increase in the number of free games creates the tendency of reduction in consumption of gaming media, so that the benefit of a casino might be affected. Therefore, the gaming machine has been desired which can provide games that are prevented from progressing monotonously, and thus can provide a player with a feeling of tension.

In light of the above-mentioned issues, the present invention is made, and the purpose thereof is to provide a gaming machine which can provide games that are prevented from progressing monotonously, and thus can provide a player with a feeling of tension, thereby facilitating the consumption of more gaming media.

A feature of the present invention is a gaming machine capable of obtaining a game result based on a plurality of rearranged symbols, including:

a symbol display unit for rearranging the plurality of symbols;

a memory having a first symbol determination table for causing a first symbol to appear on the symbol display unit in a normal game mode with a first probability, the normal game mode being to execute a normal mode game, and a second symbol determination table for causing a second symbol to appear on the symbol display unit in a chance game mode with a second probability, the chance game mode being to execute a chance game; and a controller for executing processes of:

(1-1) entering the mode into the chance game mode under the condition that a first symbol appears on a symbol display unit in the normal game mode;

(1-2) terminating the chance game mode under the condition that the number of games reaches a predetermined number in the chance game mode; and (1-3) discontinuing the currently played chance game and starting afresh the chance game from the first game under the condition that a second symbol appears on the symbol display unit upon the number of games being less than a predetermined number in the chance game mode.

In this way, a chance game is started afresh from a first game, and thus simply adding more chance mode games is avoided. It is thus possible to provide the game that is prevented from progressing monotonously and provide a player with a feeling of tension. Furthermore, since the number of times of chance games can be limited, returning to the normal mode game can facilitate the consumption of more gaming media.

In addition to the above, a feature of the present invention is to include the second symbol determination table including a plurality of determination tables having the second probabilities different from one another; and the process (1-1) including the process of:

(1-1-1) selecting a determination table from among the plurality of determination tables at random.

In this way, it is possible to adjust the degree of achievement of chance games in a row.

Furthermore, a feature of the present invention is to include the process (1-1) including the process of:

(1-1-2) reporting information on a determination table selected at the process (1-1-1).

In this way, a player can recognize the degree of achievement of chance games in a row.

A feature of the present invention is a gaming machine capable of obtaining a game result based on a plurality of rearranged symbols, comprising:

a symbol display unit for rearranging the plurality of symbols;

a memory having a first symbol determination table for causing a first symbol to appear on the symbol display unit in a normal game mode with a first probability, the normal game mode being to execute a normal mode game, and a plurality of second symbol determination tables for causing a second symbol to appear on the symbol display unit in a chance mode with a second probability, the plurality of second symbol determination tables having the second probabilities different from one another, and the chance game mode being to execute a chance game; and a controller for executing processes of:

(1-1) entering the mode into the chance game mode under the condition that a first symbol appears on a symbol display unit in the normal game mode;

(1-2) selecting a second determination table from among the plurality of second symbol code determination tables at random upon entering the mode into the chance game mode;

(1-3) reporting information on one of the second determination tables selected at the process (1-2);

(1-4) initializing the number of games of the chance games upon entering the mode into the chance game mode;

(1-5) starting the chance game from the first game;

(1-6) counting the number of games of the executed chance games;

(1-7) terminating the chance game mode under the condition that the number of games reaches a predetermined number in the chance game mode;

(1-8) discontinuing the currently played chance game under the condition that a second symbol appears on the symbol display unit upon the number of games being less than a predetermined number in the chance game mode;

(1-9) initializing the number of the games of the chance games after executing the process (1-8); and (1-10) returning the process to the process (1-4) after executing the process (1-9).

In this way, a chance game is started afresh from a first game, and thus simply adding more chance mode games is avoided. It is thus possible to provide the game that is prevented from progressing monotonously and provide a player with a feeling of tension. Furthermore, the number of chance games can be limited, and thus returning to a normal mode game can facilitate the consumption of more gaming media.

It is possible to provide a gaming machine which can provide games that are prevented from progressing monotonously so as to provide a player with a feeling of tension, thereby facilitating the consumption of more gaming media.

BRIEF DESCRIPTION OF THE DRAWINGS

FIG. 11 is a diagram showing an example of a configuration of a symbol code determination table.

FIG. 12 is a diagram showing a field structure of the symbol code determination table in which a plurality of tables is integrated into a single table.

FIG. 14 is a diagram showing an example of payout tables.

DESCRIPTION OF THE PREFERRED EMBODIMENTS

Overview of Gaming Machine According to Embodiments

Figure 1:
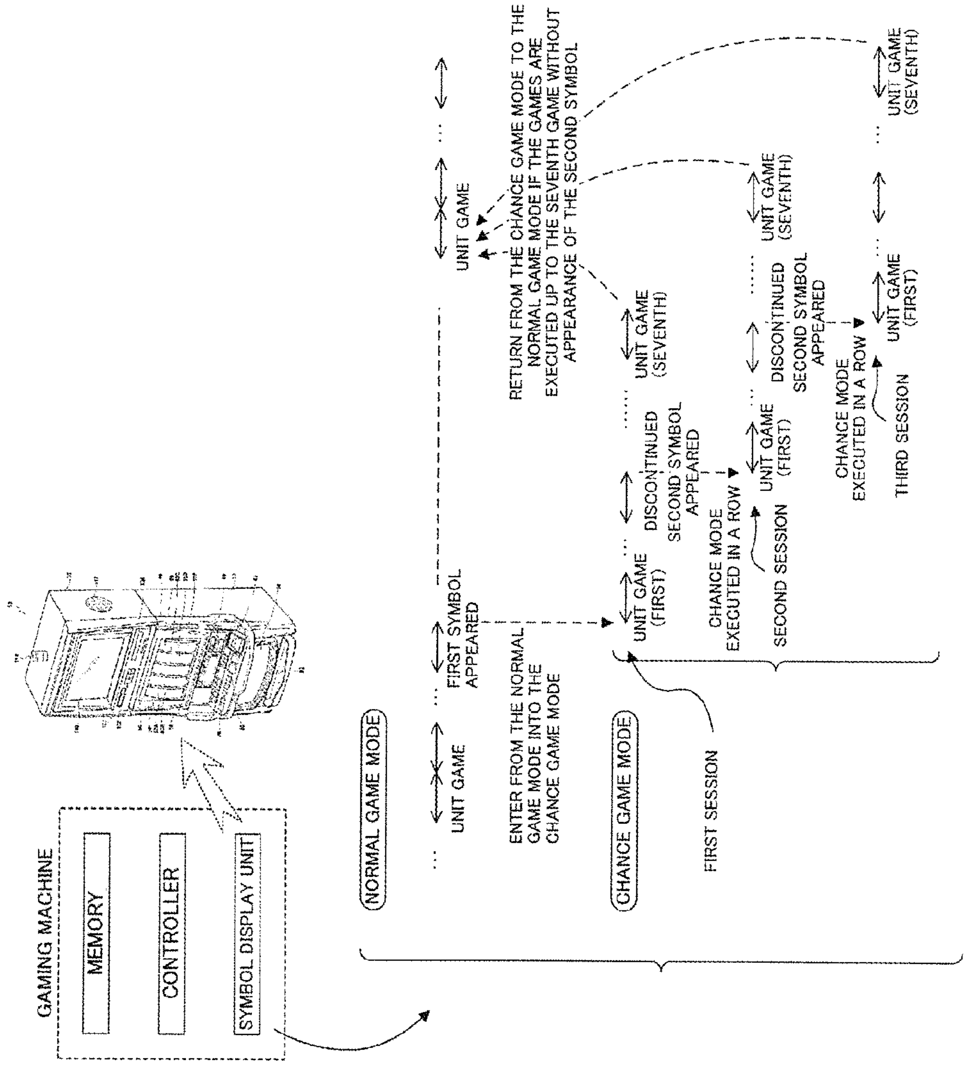
FIG. 1 is a diagram showing an overview of a gaming machine according to an embodiment of the present invention.

FIG. 1 is a diagram showing an overview of a gaming machine according to an embodiment of the present invention.

Figure 22:
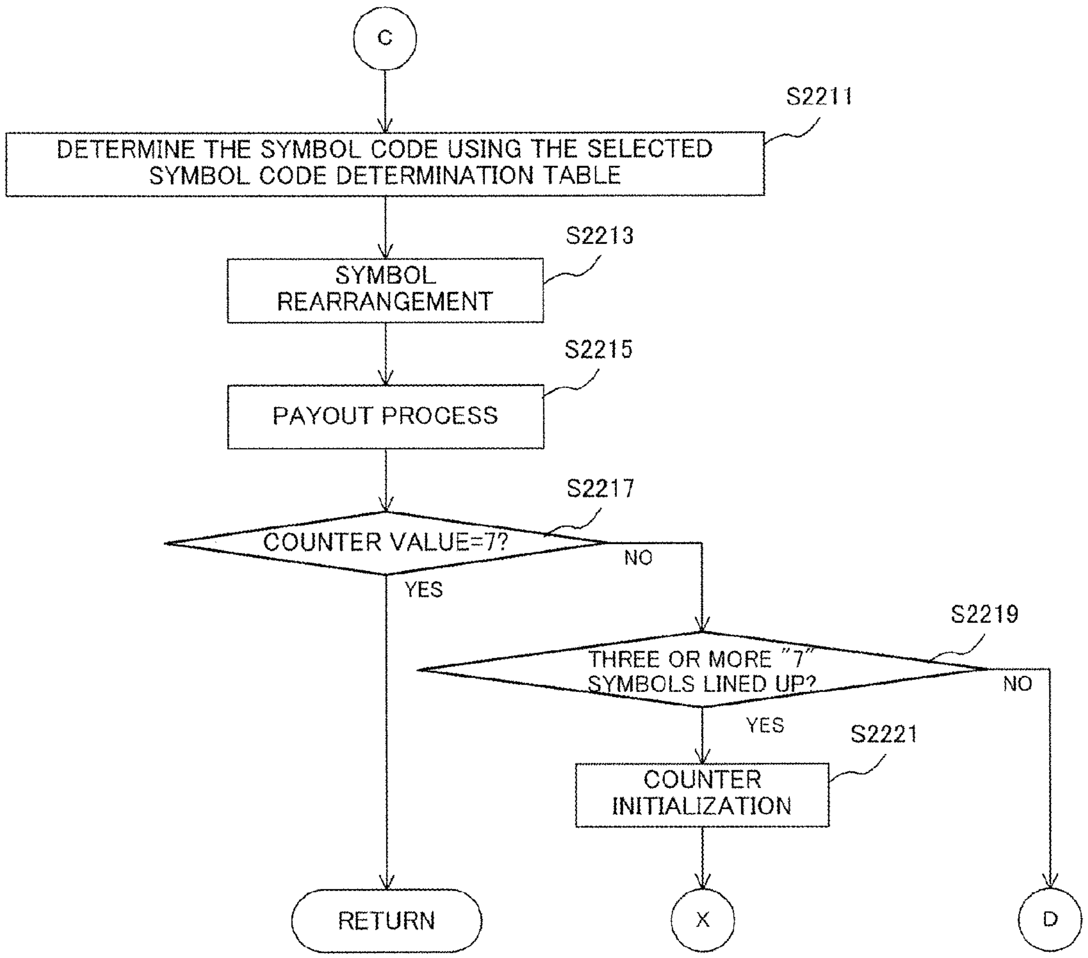
FIG. 22 is a flowchart showing the chance mode gaming process.

A gaming machine according to an embodiment is the gaming machine capable of obtaining a game result based on a plurality of rearranged symbols, including:

a symbol display unit (such as a symbol display unit 40 described below, for example) for rearranging the plurality of symbols;

a memory (such as a ROM 224 and a RAM 226 described below, for example) having a first symbol determination table (such as a symbol determination table 340 described below, for example) for causing a first symbol (such as a "SAPPHIRE" symbol described below, for example) to appear on the symbol display unit in a normal game mode with a first probability, the normal game mode being to execute a normal mode game, and a second symbol determination table (such as symbol determination tables 341 to 343 described below, for example) for causing a second symbol (such as a "7" symbol described below, for example) to appear on the symbol display unit in a chance game mode with a second probability, the chance game mode being to execute a chance game; and a controller (such as a CPU 222 described below, for example) for executing processes of:

(1-1) entering the mode into the chance game mode under the condition that a first symbol appears on a symbol display unit in the normal game mode (such as steps S404 and S408 in FIG. 15 described below, for example);

(1-2) terminating the chance mode under the condition that the number of games reaches a predetermined number in the chance game mode (such as step S2217 in FIG. 22 described below, for example); and (1-3) discontinuing the currently played chance game (termination of i-th session) and starting afresh the chance game from the first game (start of i+first session) under the condition that a second symbol appears on the symbol display unit upon the number of games being less than a predetermined number in the chance game mode (such as steps S2219 and S2221 in FIG. 22 described below, for example).

In the gaming machine according to the present embodiment, a game result can be obtained based on a plurality of symbols rearranged on the symbol display unit. The gaming machine according to the present embodiment is provided with the symbol display unit, the memory, and the controller. The plurality of symbols is rearranged on the symbol display unit.

The memory has the first symbol determination table and the second symbol determination table. The first symbol determination table is the table for causing a first symbol to appear on the symbol display unit in a normal game mode with a first probability, the normal game mode being to execute a normal mode game. More specifically, when the symbols are rearranged on the symbol display unit using the first symbol determination table in the normal game mode, the first symbols appear on the symbol display unit with the first probability. The second symbol determination table is the table for causing a second symbol to appear on the symbol display unit in the chance game mode with a second probability, the chance game mode being to execute a chance mode game. More specifically, when the symbols are rearranged on the symbol display unit using the second symbol determination table in the normal game mode, the second symbols appear on the symbol display unit with the second probability.

The controller executes the processes (1-1) to (1-3).

The process (1-1) is the process for entering the mode to the chance game mode under the condition that the first symbol appears on a symbol display unit in the normal game mode. The process enables the mode to enter from the normal game mode into the chance game mode.

The process (1-2) is the process for terminating the chance game mode under the condition that the number of games reaches a predetermined number in the chance game mode. The process enables the mode to return from the chance game mode to the normal game mode.

The process (1-3) is the process for discontinuing the currently played chance game and starting afresh the chance game from the first game under the condition that a second symbol appears on the symbol display unit upon the number of games being less than a predetermined number in the chance game mode. The process enables the chance games to be played in a row. The chance games, however, is not simply added, but can be started from the first game so as to play the chance games in a row.

In this way, a chance game is started afresh from a first game, and thus simply adding more chance mode games is avoided. It is thus possible to provide the game that is prevented from progressing monotonously and provide a player with a feeling of tension. Furthermore, the number of chance games can be limited, and thus returning to a normal mode game can facilitate the consumption of more gaming media.

Furthermore, in the gaming machine according to the present embodiment, the second symbol determination table includes a plurality of determination tables having the second probabilities different from one another; and the process (1-1) includes the process of:

(1-1-1) selecting a determination table from among the plurality of determination tables at random (such as the process at step S2113 in FIG. 21 described below, for example).

In this way, it is possible to adjust the degree of achievement of chance games in a row.

Furthermore, in the gaming machine according to the present embodiment, the process (1-1) includes the process of:

(1-1-2) reporting information on a determination table selected at the process (1-1-1) (such as the process at step S2115 in FIG. 21 described below, for example).

In this way, a player can recognize the degree of achievement of chance games in a row.

The gaming machine according to the present invention is capable of obtaining a game result based on a plurality of rearranged symbols, including:

a symbol display unit (such as a symbol display unit 40 described below, for example) for rearranging the plurality of symbols;

a memory (such as a ROM 224 and a RAM 226 described below, for example) having a first symbol determination table (a symbol determination table 340 described below, for example) for causing a first symbol (a "SAPPHIRE" symbol described below, for example) to appear on the symbol display unit in a normal game mode with a first probability, the normal game mode being to execute a normal mode game, and a plurality of second symbol determination tables (such as symbol determination tables 341 to 343 described below, for example) for causing a second symbol (a "7" symbol described below, for example) to appear on the symbol display unit in a chance mode with a second probability, the plurality of second symbol code determination tables having the second probabilities different from one another, and the chance game mode being to execute a chance game; and a controller for executing processes of:

(1-1) entering the mode into the chance game mode under the condition that a first symbol appears on a symbol display unit in the normal game mode (such as steps S404 and S408 in FIG. 15 described below, for example);

(1-2) selecting a second determination table from among the plurality of second symbol code determination tables at random upon entering the mode into the chance game mode (such as step S2113 in FIG. 21 described below, for example);

(1-3) reporting information on one of the second determination tables selected at the process (1-2) (such as step S2115 in FIG. 21 described below, for example);

(1-4) initializing the number of games of the chance games upon entering the mode to the chance game mode (such as step S2111 in FIG. 21 described below, for example);

(1-5) starting the chance game from the first game (such as step S2213 in FIG. 22 described below, for example);

(1-6) counting the number of games of the executed chance games (such as step S2125 in FIG. 21 described below, for example);

(1-7) terminating the chance game mode under the condition that the number of games reaches a predetermined number in the chance game mode (such as step S2219 in FIG. 22 described below, for example);

(1-8) discontinuing the currently played chance game under the condition that a second symbol appears on the symbol display unit upon the number of games being less than a predetermined number in the chance game mode (termination of i-th session) (such as step S2219 in FIG. 22 described below, for example);

(1-9) initializing the number of the games of the chance games after executing the process (1-8) (such as step S2221 in FIG. 22 described below, for example); and (1-10) returning the process to the process (1-4) after executing the process (1-9) (start of i+first session) (such as step S2221 in FIG. 22 and step S2127 in FIG. 21 described below, for example).

In this way, a chance game is started afresh from a first game, and thus simply adding more chance mode games is avoided. It is thus possible to provide the game that is prevented from progressing monotonously and provide a player with a feeling of tension. Furthermore, the number of chance games can be limited, and thus returning to a normal mode game can facilitate the consumption of more gaming media.

Embodiments will be described below with reference to the drawings.

<<<<First Embodiment of the Slot Machine>>>>

Figure 2:
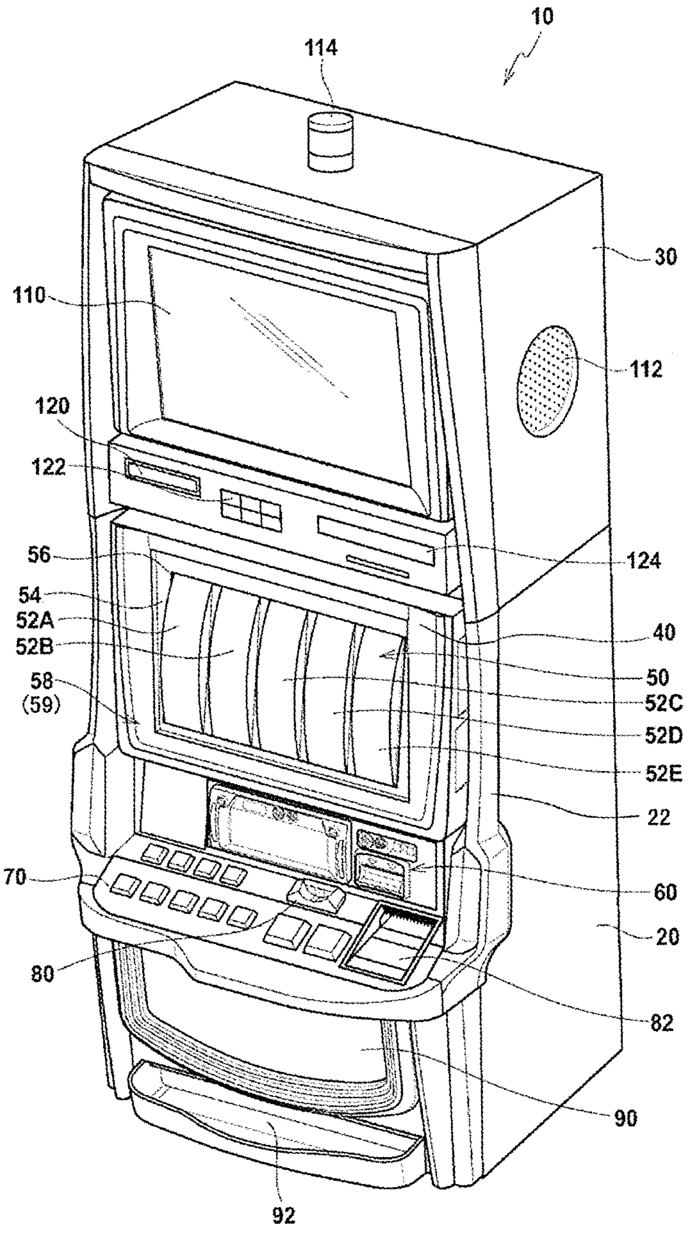
FIG. 2 is a perspective view showing a slot machine of an embodiment of the present invention.

FIG. 2 is a perspective view showing a slot machine according to the present embodiment.

Gaming medium that can be used in a slot machine 10 includes a coin, a bill, or electrical information corresponding thereto. Also, credits stored in a barcoded ticket or an IC card can be used as the game medium in the slot machine 10. The gaming media is not limited to those mentioned above, but the other types of media can be used as well.

The slot machine 10 shown in FIG. 2 is equipped with a cabinet 20, a top box 30 installed on the cabinet 20, and a main door 22 mounted in front of the cabinet 20.

A symbol display unit 40 including a reel assembly 50 is provided at the main door 22. In the present embodiment, the reel assembly 50 includes five reels 52A to 52E. Each of the reels 52A to 52E has a drum whose outer peripheral surface bears a plurality of types of symbols. The symbol display unit 40 includes a reel cover 54 which is attached in front of the reel assembly 50 and has a display window 56. The reel cover 54 is provided on the outside so that a player can visually identify a part of the reels 52A to 52E. The reel cover 54 is provided on a display panel 58. It is preferable to use a transparent liquid crystal panel as the reel cover 54. The symbol display unit 40 includes a touch panel 59 for detecting touch input by a player.

In a state where the reels 52A to 52E are stopped, three symbols out of the symbols provided on each of the reels 52A to 52E are exposed through the window 56. In this way, a symbol matrix with three rows and five columns are formed in the display window 56. One or more lines are set in advance as pay lines for determining whether or not a winning has achieved. Each time a unit game is executed, the reels 52A to 52E provided with symbols spin in speed different from one another, and then stops to expose the symbols through the window 56, thereby rearranging the symbols. The rearrangement of the symbols determines the result of the unit game. A benefit depending on the game result is awarded to the player. For example, when a winning combination by the rearranged symbols is achieved along one of the pay lines, a predetermined amount of payout is given to the player. Also, the rearrangement of the symbols determines a game mode of the subsequent unit game. The game modes are a normal mode and a chance mode, which will be described below in detail.

In addition, in the present embodiment, the unit game refers to the game that is executed in the period from the time when the start process of the credit for starting the game is executed to the time when the symbol columns stops so that the symbols are rearranged at the display window 56, followed by the carrying out of the end process such as the payout corresponding to the result of the game. In addition, since the free game does not require a betting operation by the player, it is possible to set the time when the credit process is executed in the slot machine 10 as the start of the game. Furthermore, in the case of the game other than the free game, it is possible to set the time when the betting operation is done by the player as the start of the game. Moreover, the process corresponding to the result of the game determined depending on the rearranged symbols can be set as the end process. For example, it is possible to set the time, for example, when the payout process is executed corresponding to the winning as the end of the game.

A betting amount and a credit amount are displayed in predetermined areas on the display panel 58 of the reel cover 54. The credit amount indicates the number of coins that are owned by the player and deposited inside the slot machine 10. The payout amount indicates the number of coins to be given to the player when a winning combination is achieved.

The slot machine 10 employs the mechanical reels 52A to 52E in the present embodiment. In addition thereto, video reels or a combination of the mechanical reels and the video reels may be used.

An IC card reader 60 is provided below the symbol display unit 40. The IC card reader 60 receives an IC card. The IC card stores predetermined data such as player identification information and game log data related with the games that the player has previously played. The IC card also can store data equivalent to coins, bills, or credits owned by the player. The IC card reader 60 reads and writes data from and to the inserted IC card. It is preferable that the IC card reader 60 is provided with a liquid crystal display unit for displaying the data read from the IC card.

Figure 3:
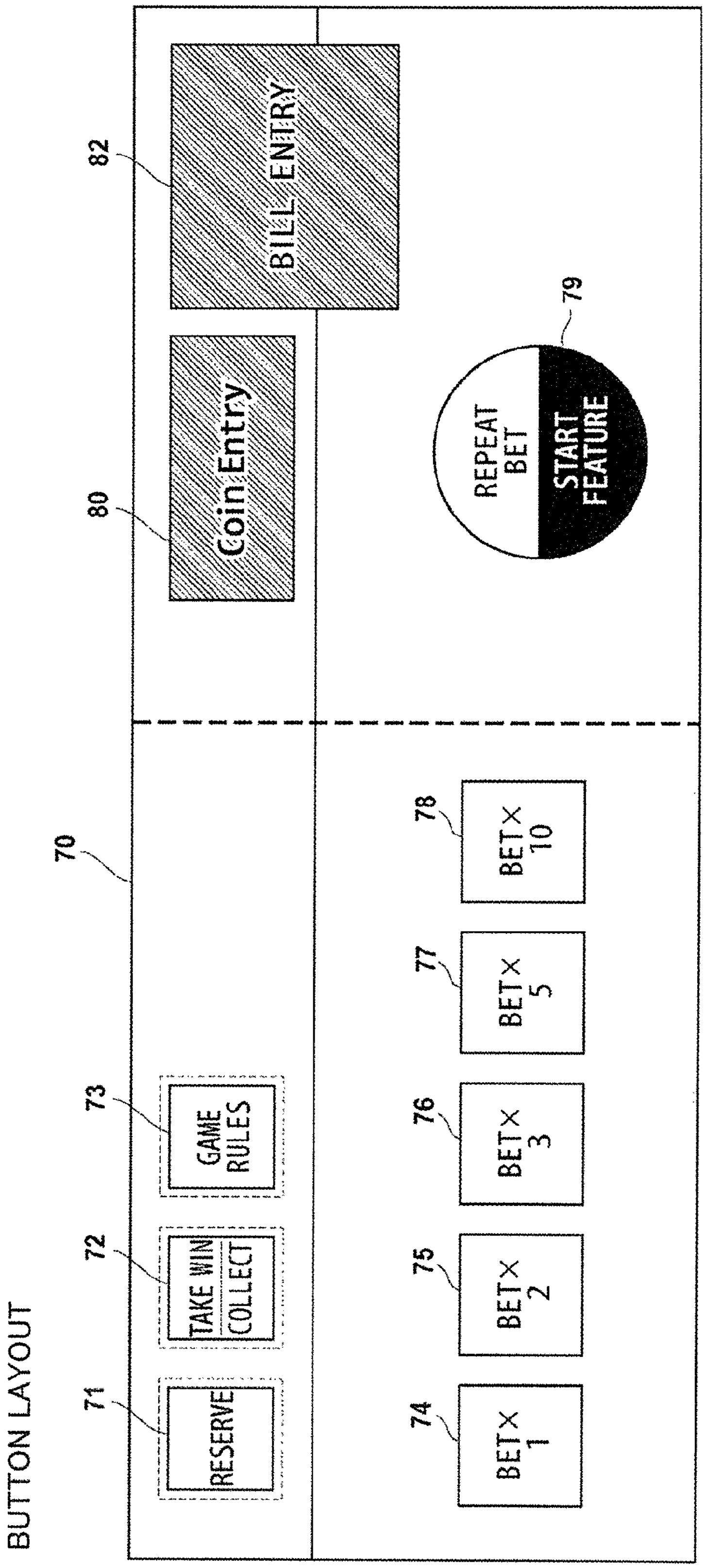
FIG. 3 illustrates a button layout in a control panel of the slot machine shown in FIG. 2.

A control panel 70 is provided in front of a lower end of the IC card reader 60. The control panel 70 is provided with various buttons, a coin insertion unit 80, and a bill insertion unit 81. Specifically, as shown in FIG. 3, a "RESERVE" button 71, a "COLLECT" button 72, and a "GAME RULES" button 73 are provided on an upper left area of the control panel 70. A "1-BET" button 74, a "2-BET" button 75, a "3-BET" button 76, a "5-BET" button 77, and a "10-BET" button 78 are provided on a lower left area of the control panel 70. Also, a "START" button 79 is provided on the lower center area of the control panel 70. The coin insertion unit 80 is provided in the upper center area of the control panel 70, and the bill insertion unit 82 is provided in the right area of the control panel 70.

The "RESERVE" button 71 is used when the player temporarily leaves the seat or when the player wants to ask a staff of the game facility to exchange money, etc. Also, the "RESERVE" button 71 can be used to store credits remaining in an IC card inserted into the IC card reader 60. The "COLLECT" button 72 is used to instruct the slot machine 10 to pay out credited coins to a coin tray 92. The "GAME RULES" button 73 is used when the player is not acquainted with game rules or operation method. When the "GAME RULES" button 73 is pressed, various types of help information are displayed on a video display unit 110.

The "BET" buttons 74 to 78 are used to set the betting amount. Each time the "1-BET" button 74 is pressed, one credit among the current credits owned by the player is bet for each of the active pay lines. When the "2-BET" button 75 is pressed, the game starts on condition that two credits are bet for each of the active pay lines. When the "3-BET" button 76 is pressed, the game starts on condition that three credits are bet for each of the active pay lines. When the "5-BET" button 77 is pressed, the game starts on condition that five credits are bet for each of the active pay lines. When the "10-BET" button 78 is pressed, the game starts on condition that ten credits are bet for each of the active pay line. The "START" button 79 is used to instruct the initiation of spinning the reels 52A to 52E under the betting condition that is set in advance.

When a coin is inserted into the coin insertion unit 80, the inserted coins is guided into a hopper inside the cabinet 20. When a bill is inserted into the bill insertion unit 82, it is determined whether or not the inserted bill is legitimate, and then only a legitimate bill is received into the cabinet 20.

On a lower front face of the main door 22 and below the control panel 30, there are provided a lower glass part 90 and a coin tray 92. The lower glass part 90 bears a character of the slot machine 10 or the like drawn thereon. Coins are paid out on the coin tray 92 from the cabinet 20.

As shown in FIG. 2, a video display unit 110 having a liquid crystal panel is provided at the front surface of the top box 30. The video display unit 110 provides video effect for enhancing the amusingness of the game. Furthermore, the video display unit 110 also displays information on the game rules and how to operate. A speaker 112 and a lamp 114 are provided on the side and top surfaces, respectively, of the top box 30. The slot machine 10 provides sound effect or flashing light through the speaker 112 or the lamp 114, which enhances the amusingness of the game.

A ticket printer 120, a keypad 122, and a data display device 124 are provided in the lower part of the video display unit 110.

The ticket printer 120 prints, on a ticket, a bar code containing the credit data, date and time, and an ID number of the slot machine 10 to output the barcode ticket. The player can exchange the barcode ticket with bills or the like at a predetermined location in a gaming facility (e.g., from a casher in a casino).

The keypad 122 has a plurality of keys. The operation of the plurality of keys by the player allows the various instructions pertinent to the issuance of the ticket. The data display device 124, which has a fluorescent display tube, LEDs, or the like, displays data input by the player through the keypad 122.

<<<Electrical Configuration of the Slot Machine>>>

Figure 4:
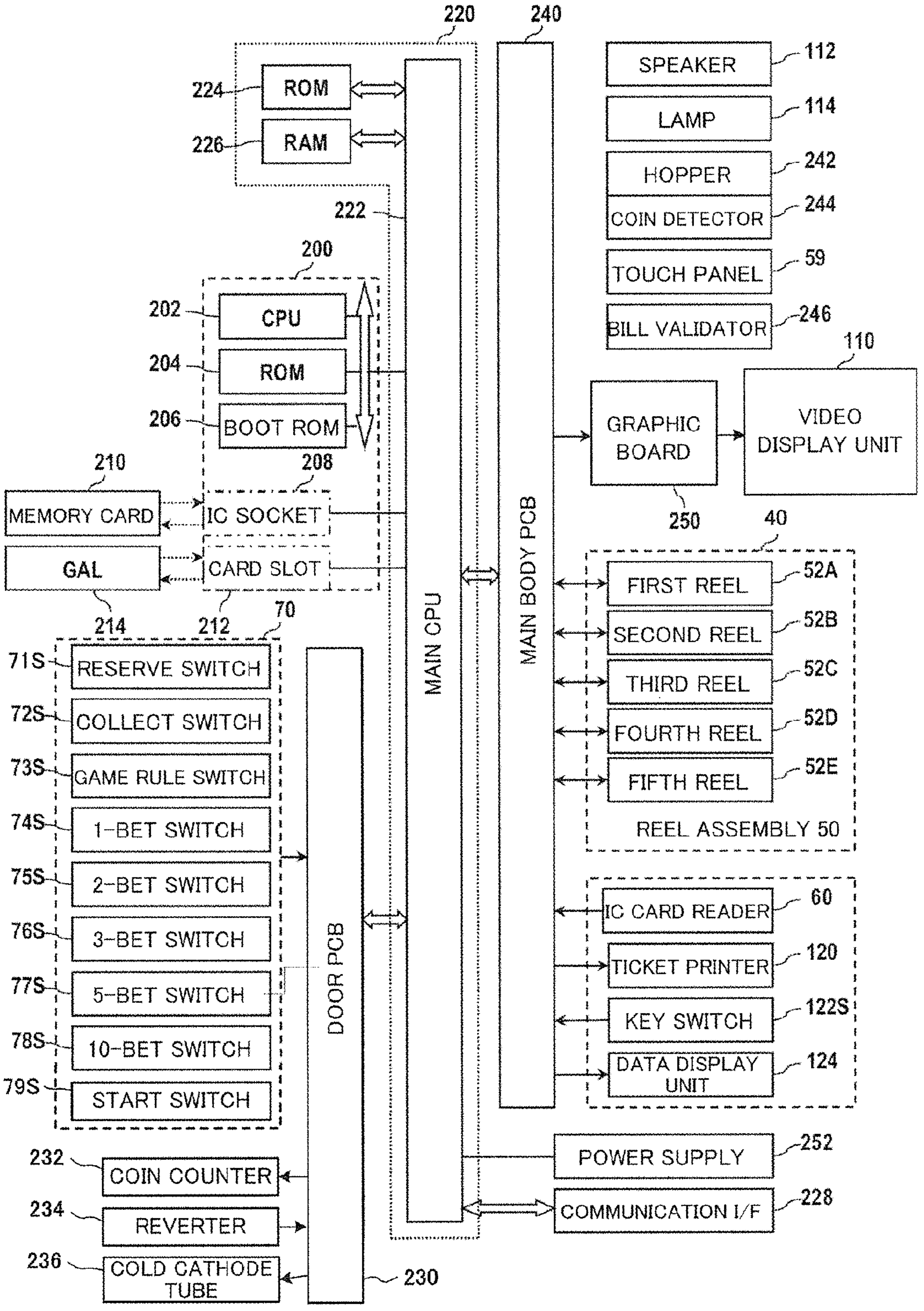
FIG. 4 is an electrical block diagram of the slot machine shown in FIG. 2.

FIG. 4 is an electric block diagram of the slot machine 10 shown in FIG. 2. The slot machine 10 includes a game board 200, a motherboard 220, a door PCB 230, and a main body PCB 240.

A game board 200 includes a CPU 202, a ROM 204 accessible from the CPU 202 through an internal bus, and a boot ROM 206 accessible from the CPU 202 by an internal bus. The game board 200 includes an IC socket 208 which can accommodate a memory card 210 and communicate therewith, and a card slot 212 provided corresponding to a Generic Array Logic (GAL) 214.

The memory card 210 includes a non-volatile memory and stores a game program and a game system program.

The IC socket 208 is configured to be removably attached by the memory card 210. The IC socket 208 is connected to a motherboard 220 by an IDE bus. The game executed in the slot machine 10 can be changed by replacing the memory card 210 with another one. The game executed in the slot machine 10 also can be changed by withdrawing the memory card 210 from the IC socket 208, writing another program into the memory card 210, and then inserting the memory card 210 into the card slot 208 again.

The GAL 214, which is a type of a Programmable Logic Device (PLD) having a fixed OR array structure, has a plurality of input ports and output ports. Upon receiving a predetermined data through the input ports, the GAL 214 outputs data corresponding to the input data through the output ports.

The card slot 212 is configured in such a manner that the GAL 214 can be inserted into the card slot 212 or detached from the IC socket 212, and is connected to the motherboard 220 by a PCI bus.

The CPU 202, the ROM 204, and the boot ROM 206 interconnected by the internal bus are connected to the motherboard 220 by the PCI bus. The PCI bus enables signal transmission between the motherboard 220 and the game board 200, and supply of power from the motherboard 220 to the game board 200.

The ROM 204 stores a program. The boot ROM 206 stores a preliminary authentication program, a boot code to be used by the CPU 202 for activating the preliminary authentication program, and the like. The authentication program is a falsification check program for authenticating that the game program and the game system program are legitimate. The preliminary authentication program is a program for authenticating that the authentication program is legitimate. The authentication program and the preliminary authentication program are written in a process of verifying that the program of interest is not falsified.

A commonly available main board is used as the motherboard 220, and thus the motherboard 220 executes the game program and the game system program. The motherboard 220 includes a main CPU 222, a ROM 224, a RAM 226, and a communication interface 228.

The ROM 224 is a memory device for storing a program to be executed by the main CPU 222, and is maintained permanently along with the other data, like BIOS. The ROM 224 may be a flash memory. The BIOS program initializes peripheral devices when executed by the main CPU 222. Also, the BIOS program loads the game program and the game system program stored in the memory card 210 through the game board 200. The ROM 224 may be rewritable. However, write-protected one might be used as the ROM 224 as well.

The RAM 226 stores data and programs which are used while the main CPU 222 is in operation. For example, when the game program, the game system program, or the authentication program is to be loaded, the RAM 224 can store such programs. Also, the RAM 226 is provided with working space for the execution of the programs. For example, the space stores the number of bets, the payout amount, the credit amount, etc., which are maintained during the execution of the game. Also, a plurality of tables for defining symbols, symbol codes, winning combinations, and their probabilities is maintained during the execution of the game. Further, the RAM 226 stores a symbol code determination table. The symbol code determination table stores mapping information between symbol codes and random number which are used for determining symbols based on random numbers. In particular, the RAM 226 maintains a mode flag along with a game counter. The mode flag is the flag indicating the game mode. The game counter is the count value indicating the number of unit games which has already been executed in the chance mode or the number of remaining unit games in the chance mode.

Also, the RAM 226 stores count values of a plurality of counters. The plurality of counters include a bet counter, a payout amount counter, a credit amount counter, and a chance mode game counter which counts the number of unit games in the chance mode. In addition, some of the count values may be maintained in an internal register of the main CPU 222.

The main CPU 222 communicates with an external controller through a communication interface 228. The external controller includes, for example, a server connected through a communication channel (not shown).

The motherboard 220 is connected to the door PCB 230 and the main body PCB 240. The motherboard 220 can communicate by means of USB with the door PCB 230 and the main body PCB 240. The motherboard 220 is connected to a power supply 252. The main CPU 222 of the motherboard 220 boots up and operates using the power supplied from the power supply 252. The motherboard 220 passes a part of power to the game board 200 through the PCI bus so as to boot up the CPU 202. The door PCB 230 and the main body PCB 240 are connected to an input device. The input device includes a switch, a sensor, and peripheral devices of which operation are controlled by the main CPU 222. The door PCB 230 is connected with a control panel 70, a coin counter 232, a reverter 234, and a cold cathode tube 236.

The control panel 70 has a reserve switch 71S, a collect switch 72S, a game rule switch 73S, a 1-BET switch 74S, a 2-BET switch 75S, a 3-BET switch 76S, a 5-BET switch 77S, a 10-BET switch 78S, and a start switch 79S, each of which is provided corresponding to various buttons 71-79. Upon detecting the fact that the various buttons 71 to 79 are pressed, each of the switches 71S to 79S outputs a signal to the main CPU 222.

The coin counter 232 and the reverter 234 are provided in the coin insertion unit 80. The coin counter 232 determines whether or not the coins inserted into coin insertion unit 80 is legitimate in terms of material, shape, or the like. The coin counter 232 outputs a signal to the main CPU 222 if detecting a legitimate coin. The coins which are determined as being illegitimate are discharged to the coin tray 92. The reverter 234 operates based upon a control signal from the main CPU 222. The reverter 234 distributes the coins that are determined by the coin counter 232 as being legitimate into either a hopper 242 or a cash box (not shown). The coins are guided into the hopper 242 when the hopper 242 is not filled with coins. Contrarily, the coins are guided into the cash box when the hopper 242 is filled with coins.

The cold cathode tube 236 is provided on the rear surface of the video display unit 110. The cold cathode tube 236 functions as a backlight as well as lights based on a control signal from the main CPU 222.

The main body PCB 240 is connected to the speaker 112, the lamp 114, the hopper 242, a coin detector 244, the touch panel 59, a bill validator 246, the reel assembly 50, the IC card reader 60, a graphic board 250, the ticket printer 120, a key switch 122S, and the data display 124.

The lamp 114 is turned on/off based upon a control signal from the main CPU 222. The speaker 112 outputs a sound such as BGM based upon the control signal from the main CPU 222.

The hopper 242, which operates based upon a control signal from the main CPU 222, pays out the designated payout amount of coins to the coin tray 92 through a coin payout outlet (not shown) formed between the lower glass part 90 and the coin tray 92. The coin detector 244 detects coins paid out from the hopper 242 to output a detection signal to the main CPU 222.

The touch panel 59 detects a position touched by the player, and then provides the main CPU 222 with a position detection signal corresponding to the detected position. Upon detection of a legitimate bill, the bill validator 246 provided in the bill insertion unit 82 provides the main CPU 222 with a bill detection signal corresponding to the bill amount.

The graphic board 250 controls both the video display unit 110 and the display panel 58 of the symbol display unit 40 corresponding to a control signal from the main CPU 222. The graphic board 250 includes a Video Display Processor (VDP) for generating video data, and a video RAM for temporarily storing the video data. The video data may be generated from the game program stored in the RAM 224.

The IC card reader 60 reads out data stored in the IC card inserted into the IC card socket 208 to provide the read-out data to the main CPU 222. The IC card reader 60 writes the data supplied to the main CPU 222 into the ID card.

The ticket printer 120 prints on a ticket the barcode containing information of the credit amount stored in the RAM 226, date and time, the identification number of the slot machine 10, and the like, corresponding to the control signal from the main CPU 222 in order to output the barcoded ticket.

The key switch 122S, which is provided behind the keypad 122, outputs a key detection signal to the main CPU 222 when the keypad 122 is pressed by the player.

The data display device 124 displays information on the information that is input through the keypad 122 corresponding to a control signal from the main CPU 222.

Figure 5:
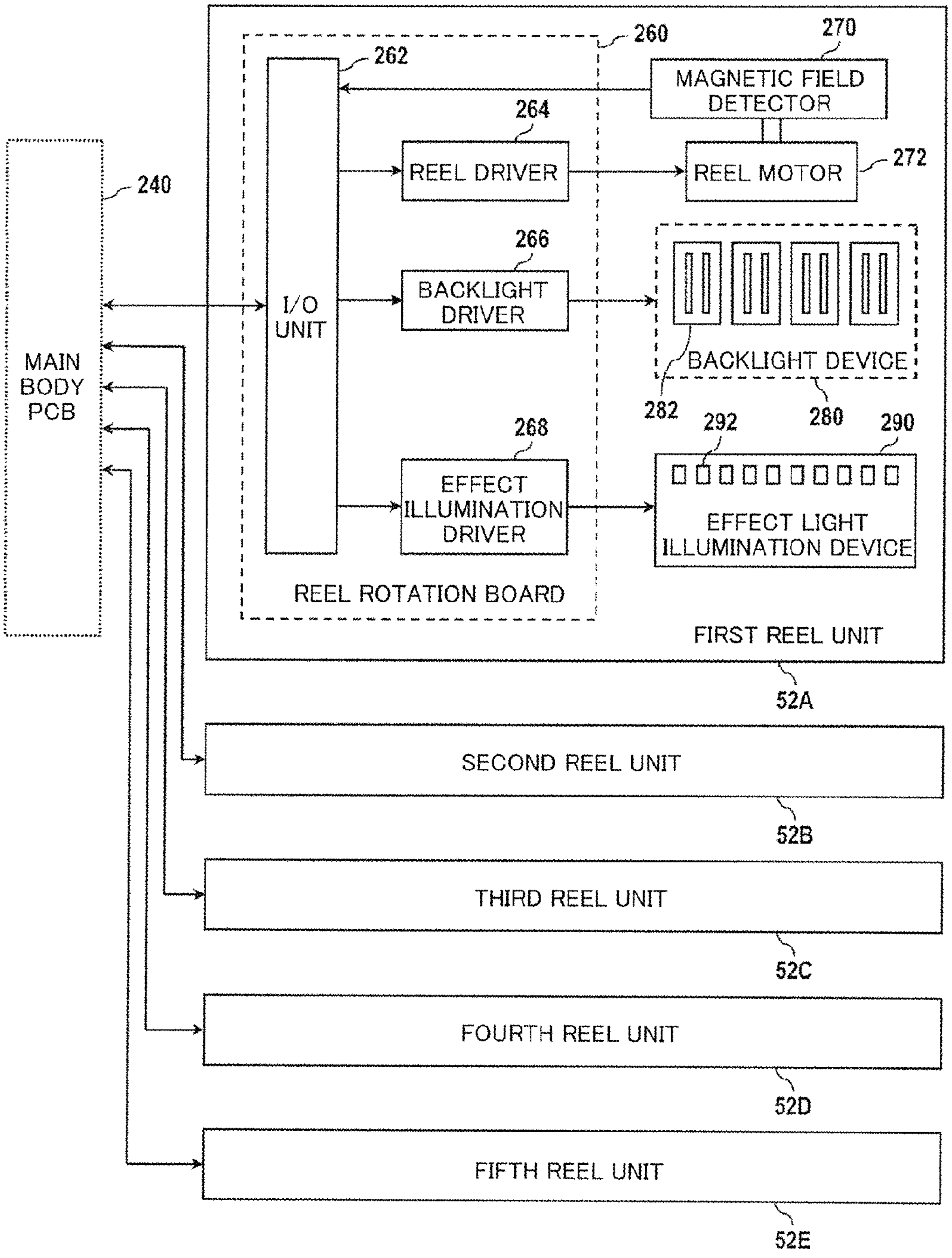
FIG. 5 is a block diagram of an electric circuit in the reel assembly.

The main body PCB 240 is electrically connected to the reel assembly 50. The reel assembly 50 includes the first to fifth reels 52A to 52E as mentioned above. FIG. 5 is a block diagram of an electric circuit in the reel assembly 50. Each of the reels 52A to 52E is provided on a reel circuit board 260. The reel circuit board 260 includes an 20 input/output (I/O) unit 262 capable of communicating with the main body PCB 240, a reel driver 264 connected to the I/O unit 262, a backlight driver 266, and an effect illumination driver 268.

The I/O unit 262 is connected to a magnetic field detector 270. The magnetic field detector 270 includes a magnetic sensor for sensing magnetic field intensity to output a magnetic detection signal proportional to the magnetic field intensity, and a sensor fixation part for fixing the magnetic sensor to a predetermined position. The magnetic sensor detects the intensity of the magnetic field generated by a magnet. The magnet is provided at a rotating axis of a reel motor 272 to rotate with the reel 52A.

The reel driver 264 supplies electric power to the reel motor 272. The backlight driver 266 supplies electric power individually to each light source 282 in a backlight device 280. The effect light illumination driver 268 supplies electric power individually to each light source 292 of an effect light illumination device 290.

Since the second to fifth reels 52B to 52E have the same configuration as the first reel 52A, detailed description thereof will be omitted.

<<<Function of the Game Program>>>

Figure 6:
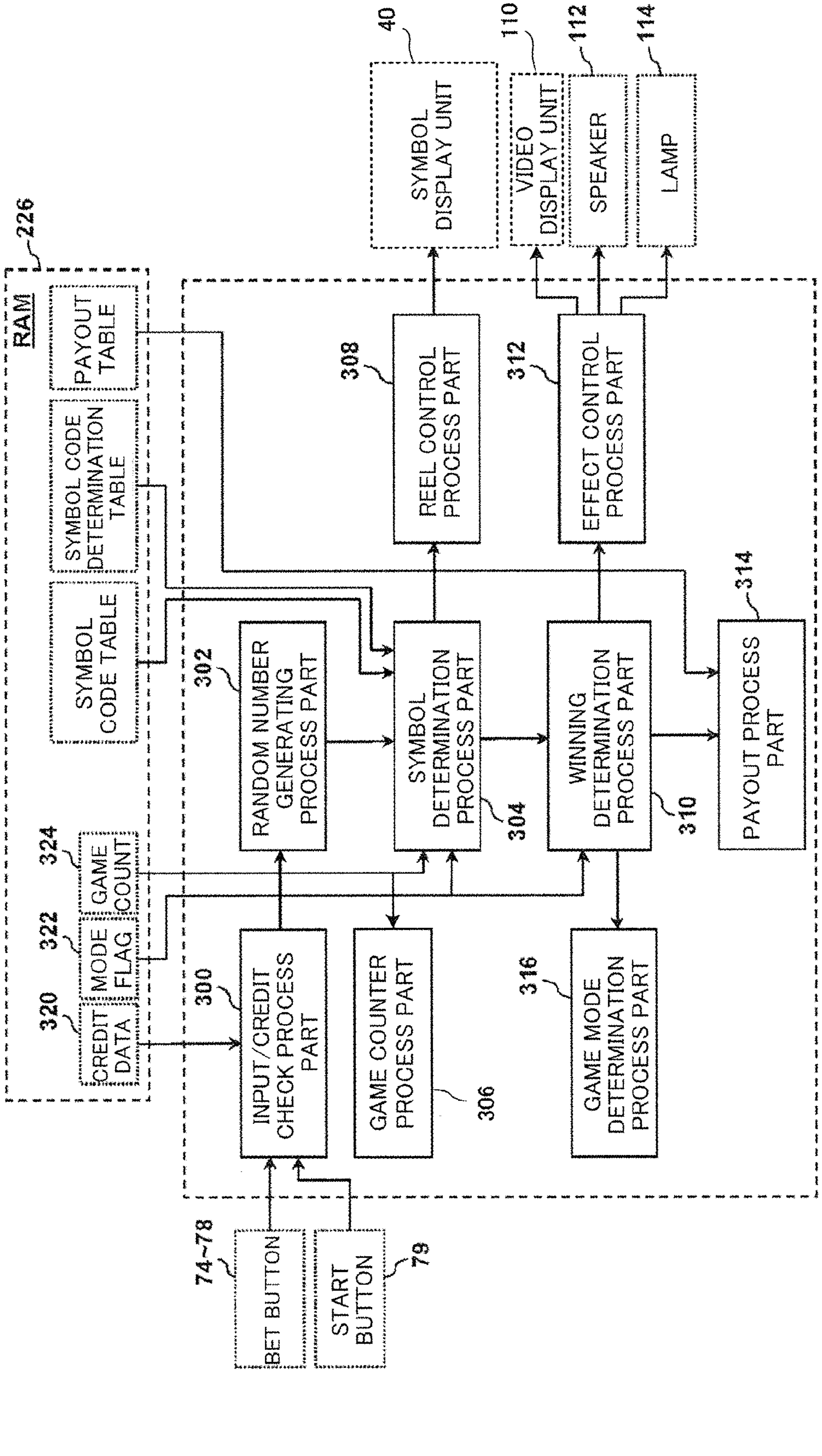
FIG. 6 is a functional block diagram showing the function of a game program executed by a main CPU 222 on the mother board 220.

FIG. 6 is a functional block diagram of the game program executed in the main CPU 222 of the motherboard 220. When the power is supplied to the slot machine 10, the main CPU 222 reads the authenticated game program and game system program from the memory card 210 through the game board 200, and writes the programs into the RAM 226. The game program is executed in a state being loaded into the RAM 226 in such a manner.

According to the preferred embodiment, the game program includes a input/credit check process part 300, a random number generating process part 302, a symbol determination process part 304, a game counter process part 306, a reel control process part 308, a winning determination process part 310, an effect control process part 312, a payout process part 314, and a game mode determination process part 316.

<Input/Credit Check Process Part 300>

The input/credit check process part 300, in an idle state where the reels 52A to 52E are stopped, continuously checks whether or not any of the "BET" buttons 74 to 78 or the "START" button 20 79 is pressed. If the "BET" buttons 74 to 78 or the "START" button 79 is pressed, the input/credit check process part 300 checks whether or not there remains any credit for the player on the basis of the credit data 320 stored in the RAM 226. If at least one credit for the player remains, the input/credit check process part 300 call the random number generating process part 302.

Subsequently, the random number generating process part 302 generates random numbers which are used in the symbol determination process part 304. In the present embodiment, the random number generating process part 302 generates five random numbers. Each of the five random numbers is used in the first to fifth reels 52A to 52E, respectively.

After five random numbers are completely extracted, the symbol determination process part 304 determines a to-be-stopped symbol for each of the reels 52A to 52E with reference to the symbol code determination table stored in the RAM 226. The symbol determination process part 304 uses five random numbers to determine five to-be-stopped symbols for the reels 52A to 52E to be appeared in the display window 56 of the symbol display unit 40 for each of the reels 52A to 52E.

In particular, the symbol determination process part 304 checks the current gaming mode with reference to the mode flag 322 stored in the RAM 226. The process of determining symbols in the normal mode is different from the process of determining symbols in the chance mode. In the normal mode, the symbol determination process part 304 uses a predetermined symbol code determination table to determine the symbol using the random number in accordance with a predetermined process. Contrarily, in the chance mode, the symbol determination process part 304 continuously changes the symbol code determination table for each unit game to vary the symbol determination process. The continuous varying of the symbol code determination table can increase winning combinations including at least one specific symbol as the chance mode game continues. The number of chance mode games executable within a single session is limited to a predetermined number of times, e.g., seven times. In order to limit the number of times of chance mode games, the game counter process part 306 counts the number of times of chance mode games which have already been executed and the number of times of chance mode games which remain in that session. The value of the game count 324 is stored in the RAM 226. The game counter process part 306 may reside in the symbol determination process part 304.

The reel control process part 308 controls the reel assembly 50 by providing stop position information corresponding to the determined symbols. In this way, the reels 52A to 52E spins, followed by stopping at the position designated by the stop position information. More specifically, the symbols scroll along with the spinning of the reels 52A to 52E. Then, the reels 52A to 52E are stopped in such a manner that the determined symbols are rearranged in the central position vertically in the window 56 of the symbol display unit 40.

The winning determination process part 310 determines whether or not a predetermined winning combination is achieved by the rearranged symbols. In case that a winning combination is achieved by the rearranged symbols, the effect control process part 312 controls the symbol display unit 40 and the other devices. The other devices include the speaker 112, the lamp 114, the video display unit 110, etc. The effect includes video and audio effect, backlight change, and lighting effect. Also, the payout process part 314 determines payout amount corresponding to the achieved winning combination to give the player that payout amount.

Furthermore, each time the unit game is completed, the game mode determination process part 316 determines the game mode of the next unit game. The game mode determination process part 316 changes the mode from the normal mode into the chance mode when a trigger event occurs in the rearranged symbols. On the other hands, the game mode determination process part 316 changes the mode from the chance mode into the normal mode when an end condition is satisfied. In the other cases, the game mode determination process part 316 maintains the previous game mode. The game mode determination process part 316 may be run in the winning determination process part 310.

<<Symbols, Winning Combinations, and Pay Lines>>

Figure 7:
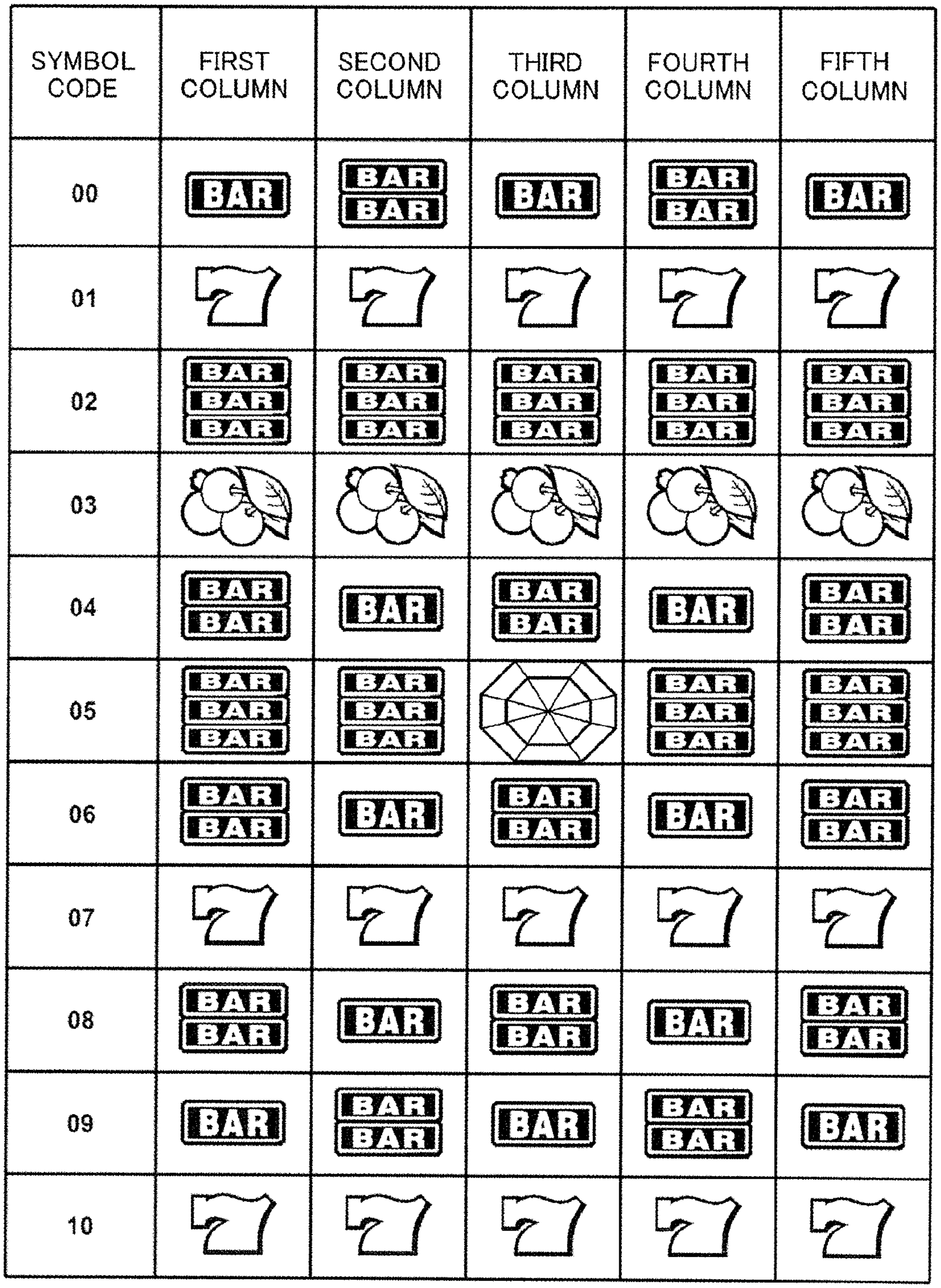
FIG. 7 illustrates an example of a symbol code table specifying symbols provided on the outer peripheral surfaces of the reels 52A to 52E.

FIG. 7 shows an example of a symbol code table specifying symbols provided on the outer peripheral surfaces of the reels 52A to 52E.

The symbols provided on each of the reels 52A to 52E form a symbol column composed of eleven symbols. As described hereinbelow, the alignment of symbols provided on each of the reels 52A to 52E are referred to as first to fifth symbol columns, respectively. In the present embodiment, the symbol columns include six types of symbols. The six types of symbols are "7", "BAR", "DOUBLE BAR", "TRIPLE BAR", "CHERRY", and "SAPPHIRE". In each of the symbol columns, each of the symbols has an assigned code ranging from "00" to "10." For example, the first symbol, "BAR", in the first symbol column is assigned a code "01." The second symbol, "7", in the first symbol column is assigned a code "00." The eighth symbol, "7", in the first symbol column is assigned a code "07."

Three consecutive symbols in each symbol column can be appeared in the display window 56 of the symbol display unit 40 to form a symbol matrix having three rows and five columns Each time the "BET" buttons 74 to 78 or the "START" button 79 are pressed, the reels 52A to 52E on which the symbols are provided starts spinning, and thus the symbols appear in the display window 56 in the manner in which the symbols are scrolled vertically. After a predetermined time period elapses, the scroll of the symbols stops to rearrange the symbol, and then the symbol matrix is formed in the display window 56.

<"SAPPHIRE" Symbol>

Figure 8:
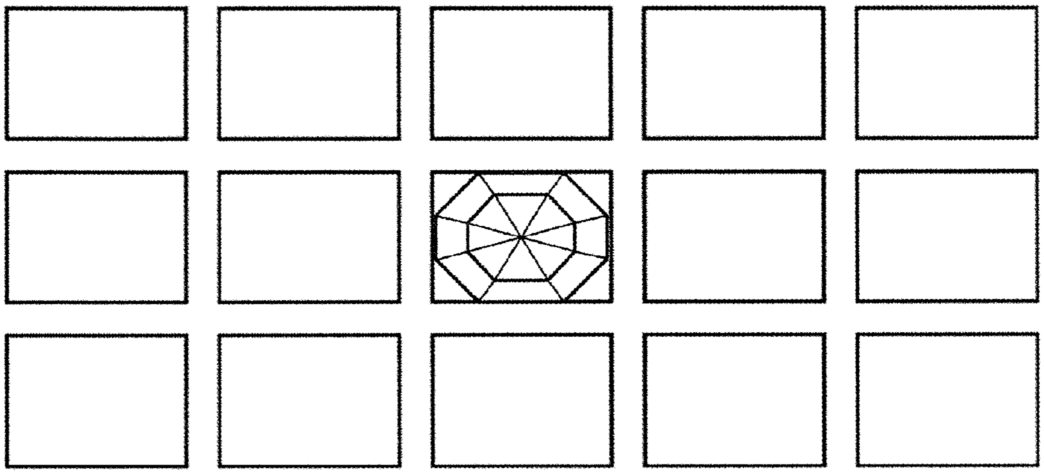
FIG. 8 is a diagram showing the state where a trigger symbol is located in a predetermined position, and a diagram showing a trigger condition for transition to the chance mode.

The "SAPPHIRE" symbol appearing only in the third symbol column serves as a trigger symbol which shifts the game mode into the chance mode. In the present embodiment, the "SAPPHIRE" symbol is configured by the image which resembles sapphire, a gem. The chance mode is initiated after the "SAPPHIRE" symbol appears at the position of the second row and third column in the display window 56, as shown in FIG. 8. In addition, the condition for returning of the game mode from the chance mode into the normal mode will be described below.

A plurality of kinds of winning combinations of symbols (referred to as "winning combinations" hereinbelow) for giving benefit to the player is preset. The benefits given to the player include a predetermined amount of payout by increasing of credits or discharging of coins.

Figure 9:
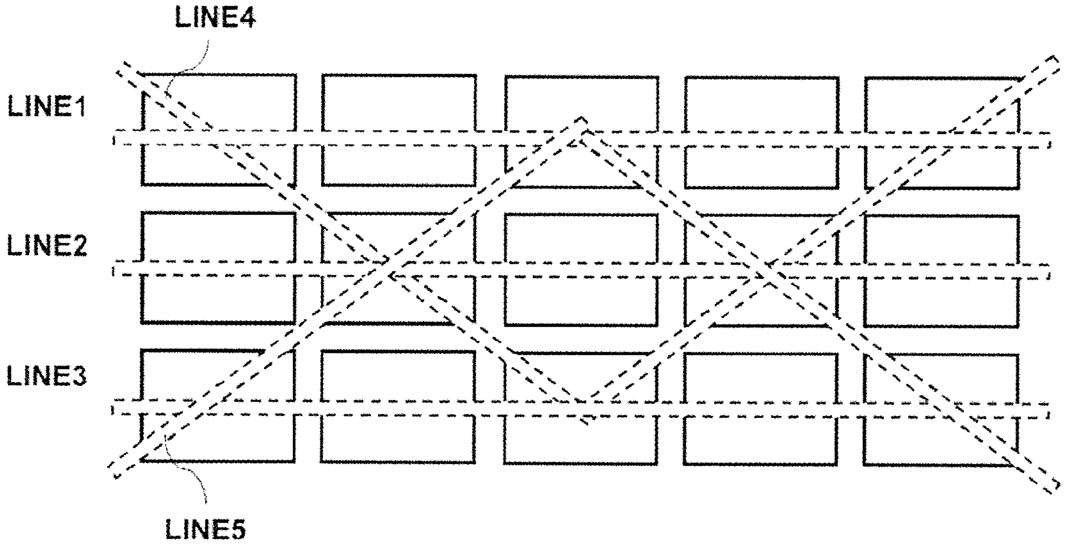
FIG. 9 is a diagram showing pay lines of the slot machine according to the present embodiment.

FIG. 9 shows pay lines set in a preferred embodiment of the present invention. In the present embodiment, five pay lines are set for the symbol matrix. First to third pay lines extend horizontally across the symbol stop positions in the first to third rows, respectively, in the symbol matrix. A fourth pay line extends in a "V"-shaped line joining the symbol stop position in the first row and the first column, the symbol stop position in the second row and the second column, the symbol stop position in the third row and the third column, the symbol stop position in the second row and the fourth column, and the symbol stop position in the first row and the fifth column. A fifth pay line extends in a "reversed V"-shaped path joining the symbol stop position in the third row and the first column, the symbol stop position in the second row and the second column, the symbol stop position in the first row and the third column, the symbol stop position in the second row and the fourth column, and the symbol stop position in the third row and the fifth column.

Each of the pay lines can be activated depending on the player's choice. However, all the five pay lines can be activated irrespective of the betting amount or the player's choice. The total number of pay lines can vary depending on the size of the symbol matrix, and the other pay lines can be set appropriately.

<<Gaming Modes: Normal Mode and Chance Mode>>

The slot machine 10 selectively executes two modes: normal mode and chance mode. The processing of the game in the chance mode is similar to that in the normal mode in most cases. However, the payouts for at least some of the winning combinations in the chance mode are different from those in the normal mode. Also, producing effects such as video effect and sound effect can differ between the two game modes. In addition, the unit game executed in the normal mode may be herein referred to simply as a normal mode game. Likewise, the unit game executed in the chance mode may be referred to simply as a chance mode game.

<<State Transition of Game>>

Figure 10:
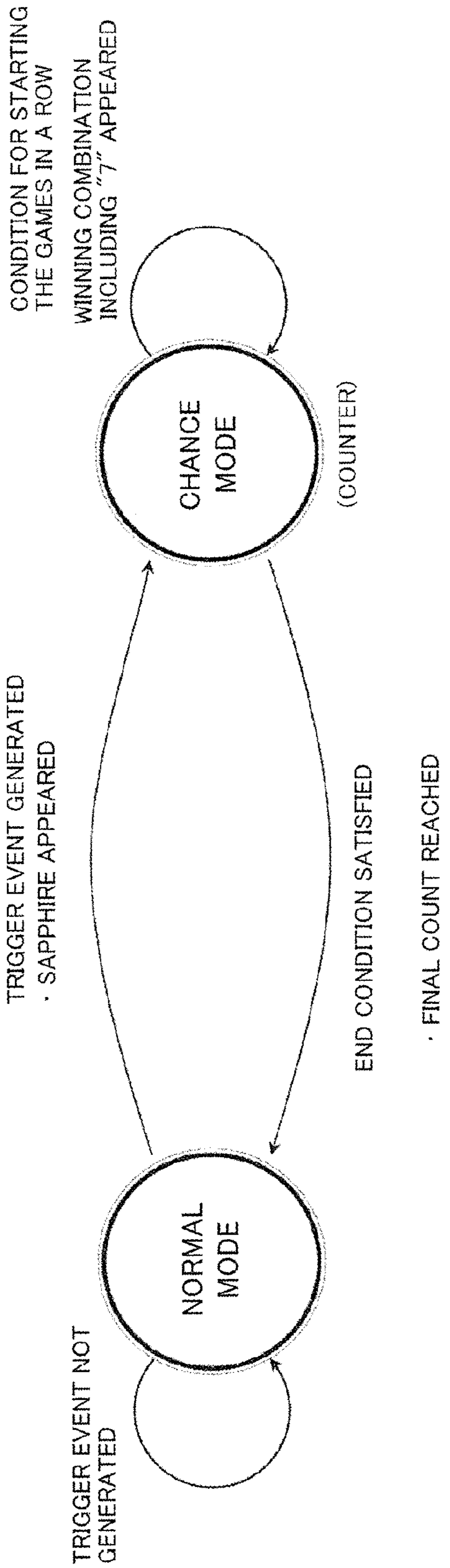
FIG. 10 is a state transition diagram of the slot machine according to the present embodiment.

FIG. 10 is a state transition diagram of the slot machine 10.

Usually, the slot machine 10 is in a state of the normal mode, and maintains the normal mode state unless a trigger event occurs. When the trigger event occurs during the normal mode, a state transition occurs to shift the game mode to the chance mode. In a preferred embodiment, the trigger event is the appearance of the "SAPPHIRE" symbol at the position in the second row and third column of the symbol matrix.

When the game mode proceeds to the chance mode, the slot machine 10 maintains this state unless an end condition is satisfied. In the present embodiment, the end condition of the free game is that the free games which are the games in the chance mode have been executed up to the predetermined number of times, such as seven. More specifically, the unit games constituting the free game in the chance mode have been executed up to seven times which is the maximum number of times of the unit games.

After the game mode proceeds to the chance mode, the slot machine 10 sets a game counter which counts up or down each time the unit game in the chance mode is executed. The maximum number of unit games in the chance mode is seven in a single chance mode session. The term "chance mode session" herein denotes the period from the time when the game mode proceeds to the chance mode (when the chance mode starts) to the time when the game mode returns to the normal mode (when the chance mode ends) and the state therein. Thus, if the value of the game counter reaches seven upon counting up or the value of the game counter reaches zero upon counting down, the game mode returns to the normal mode and the unit game restarts in the normal mode.

<<Symbol Code Determination Tables and Payout Tables>>

Regardless of the game modes, the symbol combination is determined based on a plurality of tables stored in the RAM 224 of the motherboard 220. As mentioned above, the RAM 226 stores at least one of the symbol code determination table and/or the symbol code determination table.

FIG. 11 shows an example of configuration of the symbol code determination table.

The symbol code determination tables 340 to 343 stores a mapping relationship between the random numbers generated by the random number generation process part 302 and the symbol codes indicating each of the symbols as shown in FIG. 6. Thus, each time a random number is generated by the random number generation process part 302, the symbol determination process part 304 determines a symbol code associated with a symbol with reference to the symbol code determination tables 340 to 343. The wider a random number range is, the higher the probability that the symbol associated with the widened range is determined becomes. Also, as the total range of the random numbers is widened, the probability of determining the symbol code can be controlled more precisely.

The symbol code determination table 340 is used for determining symbols in the normal mode. The symbol code determination tables 341 to 343 are used for determining symbols in the chance mode games. More specifically, the symbol code determination table 341 is the table in which the number of times of the free games in the chance mode executed in a row is determined to be about 4.5 times (the probability of executing the games in a row is 82%). The symbol code determination table 342 is the table in which the number of times of the free games in the chance mode executed in a row is determined to be about 3.0 times (the probability of executing the games in a row is 75%). The symbol code determination table 343 is the table in which the number of times of the free games in the chance mode executed in a row is determined to be about 2.0 times (the probability of executing the games in a row is 67%). When the mode enters from the normal mode into the chance mode, one of the tables is selected at random from among three symbol code determination tables 314 to 343.

In the case that the first to fifth symbol columns are different from one another, each of the symbol code determination tables 340 to 343 may be further configured by dividing them into five tables each of which correspond to its own symbol column. For example, all the tables can be integrated into a single table having 20 data fields, as shown in FIG. 12. More specifically, the symbol code determination table 340 is configured by dividing it into first to fifth symbol columns Each of the symbol code determination tables 341 to 343 is configured by dividing each of them into first to fifth symbol columns, respectively. Each of the tables can be composed of 20 data fields in total by the configuration in such a manner. Each of 20 data fields stores the mapping relationship between a random number generated by the random number generating process part 302 and a symbol code indicating each of symbols shown in FIG. 7.

Depending on the game modes and symbol columns, the symbol determination process part 304 can select one data field from among the 20 data fields to determine the symbol code. In the present embodiment, each of 20 data fields can be regarded as a separate table.

In the case that two or more symbol columns are the same as each other, the symbols can be determined in those columns using a symbol code determination table in common with each other. For example, in the example of FIG. 7, the second symbol column has the same symbol sequence as that in the fourth symbol column Thus, the symbol code determination table for the second column can be used for the symbol determination in the fourth column. Similarly, since the first symbol column has the same symbol sequence as that in the fifth symbol column Thus, the symbol code determination table for the first column can be used for the symbol determination in the fifth column.

Once the symbol determination process part 304 determines five symbols in a predetermined row (e.g., the second row) in the symbol matrix to determine all the symbols constituting the symbol matrix, the winning determination process part 310 determines whether or not any of the winning combinations is achieved, and the game mode determination process part 316 determines the game mode of a subsequent unit game.

Figure 13:
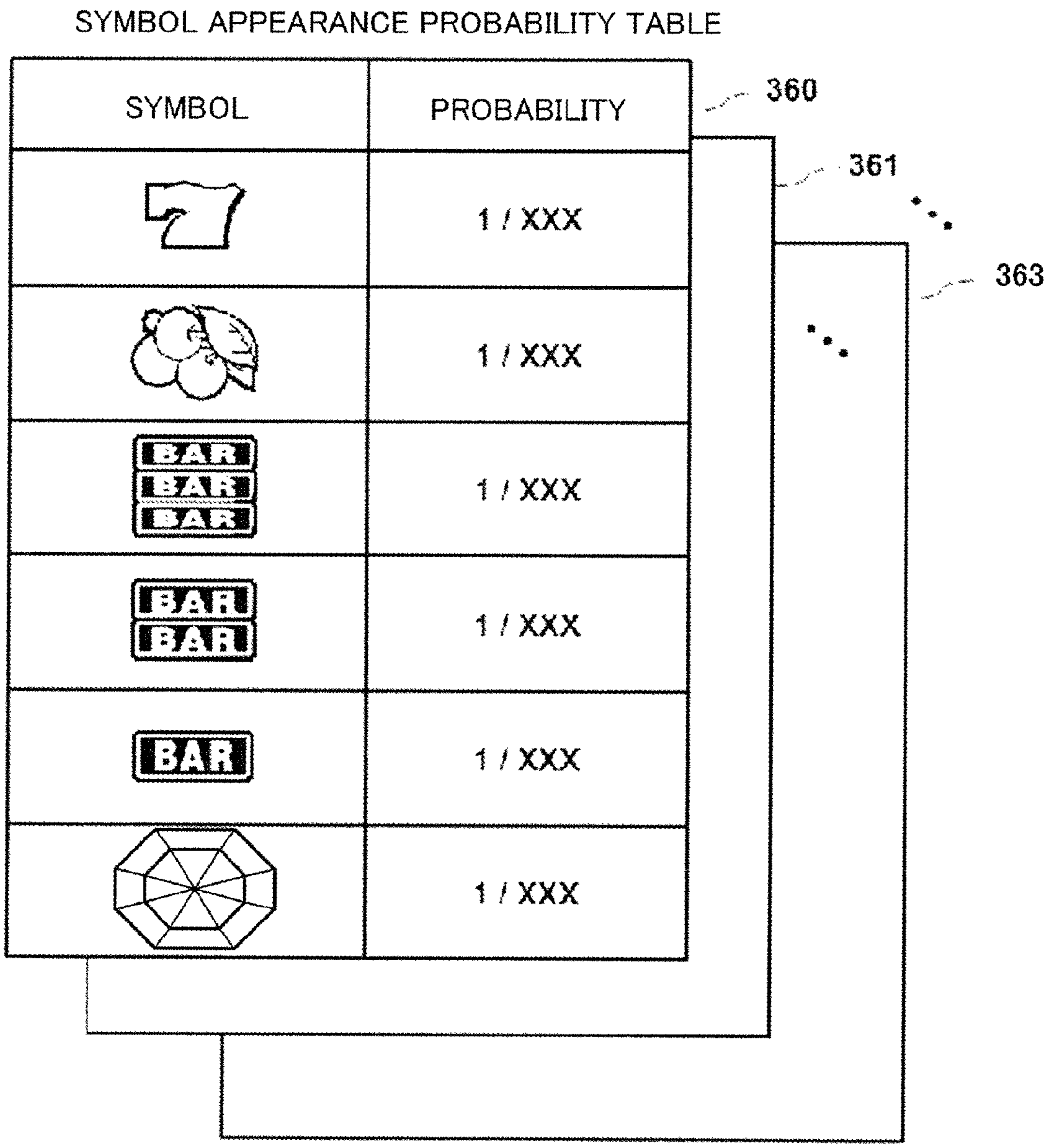
FIG. 13 is a diagram showing an example of symbol appearance probability tables.

FIG. 13 shows an example of a symbol appearance probability table. The symbol appearance probability table is the table that determines the probability of appearance of the symbols. The symbol appearance probability tables 360 to 363 specify the probabilities that each symbol appears in the pay lines. The symbol determination tables 340 to 343 shown in FIG. 11 can be prepared based on the symbol appearance probability tables 360 to 363. The symbol appearance probability table 360 is used for the normal mode, and the symbol appearance probability tables 361 to 363 are used in the chance mode games. More specifically, the symbol appearance probability table 361 corresponds to the symbol code determination table 341. The symbol appearance probability table 362 corresponds to the symbol code determination table 342. The symbol appearance probability table 363 corresponds to the symbol code determination table 343.

Similarly to the symbol code determination tables 340 to 343, each of the symbol appearance probability tables 360 to 363 may be divided into five tables each of which corresponds to its own symbol column. Furthermore, all the tables can be integrated into a single table having 20 data fields as well.

The probability that each symbol appears in pay lines influences on the probabilities that the winning combinations are achieved. Conversely, the symbol appearance probability tables 360 to 363 can be generated based on the probabilities of the winning combinations. The relationships between the winning combinations and respective probabilities can be summarized as payout tables 380 to 383 shown in FIG. 14. The payout tables 380 to 383 define the winning combinations along with their respective payouts. The payout tables 380 to 383 are prescribed separately for the normal mode games and the chance mode games. In particular, it is preferable to separately prescribe the payout tables for use in the unit games in the chance mode. Among the payout tables 380 to 389, the payout table 380 is used for the normal mode games, and the payout tables 381 to 383 are applicable for the chance mode games. All the payout tables 380 to 383 can be integrated into a single table as well. More specifically, the payout table 381 corresponds to the symbol code determination table 341. The payout table 382 corresponds to the symbol code determination table 342. The payout table 383 corresponds to the symbol code determination table 343.

Each time the unit game is executed, the winning determination process part 310, which is contained in the game program and executed by the main CPU 222, determines whether or not any winning combination is achieved in the pay lines. If the winning combination defined in the payout tables 380 to 383 is included in one of the pay lines, the winning determination process part 310 detects the winning combination and checks the payout amount with reference to the payout tables 380 to 383. The payout process part 314 pays out the determined amount. If, however, no winning combination is achieved by the symbols appeared on the pay line, it is determined to be so-called losing.

For example, in case where three "7" symbols appear in one of the pay lines LINE1 to LINE5 across the symbol columns, it is regarded as a winning combination of three "7" being achieved, and thus two hundred times the betting amount is paid out as the payout amount. The benefit of payout can be provided for the player by actually discharging coins to the coin tray 92, or adding the credits by the amount equivalent to the coin.

<<Probabilities of Winning in Chance Mode>>

As mentioned above, when the "SAPPHIRE" symbol appears at the position in the second row and third column in the symbol matrix, the game mode proceeds from the normal mode to the chance mode, and the chance mode is maintained until the end condition is satisfied. The end condition of the chance mode is that the unit games constituting the free game in the chance mode have been executed up to seven times which is the maximum number of times of the unit games.

When the game mode proceeds to the chance mode, the game counter process part 306 shown in FIG. 6 first selects a symbol code determination table from among the three symbol code determination tables 341 to 343 at random. The game counter process part 306 also sets a counter for counting the number of unit games that has been already executed in the chance mode, or the number of unit games that is to be executed in the chance mode. Then, the random number generation process part 304 generates the random numbers, and the symbol determination process part 304 determines to-be-stopped symbols using the generated random numbers with reference to the symbol code determination tables 341 to 343.

The symbol determination process part 341 is the table in which the number of times of the free games in the chance mode executed in a row is determined to be about 4.5 times (the probability of executing the games in a row is 82%). The symbol code determination table 342 is the table in which the number of times of the free games in the chance mode executed in a row is determined to be about 3.0 times (the probability of executing the games in a row is 75%). The symbol code determination table 343 is the table in which the number of times of the free games in the chance mode executed in a row is determined to be about 2.0 times (the probability of executing the games in a row is 67%). Each of the symbol code determination tables 341 to 343 has a mapping data between the random number and the symbol code.

In the present embodiment, a specific symbol is a "7" symbol. More specifically, when more than three "7" symbols appear in one of the pay lines in the chance mode, the chance game in the current session is terminated and then the chance game in the next session is started afresh from the first game.

<<Operation of Slot Machine>>

The operation of the slot machine 10 will be described with reference to FIGS. 15 to 20.

Figure 15:
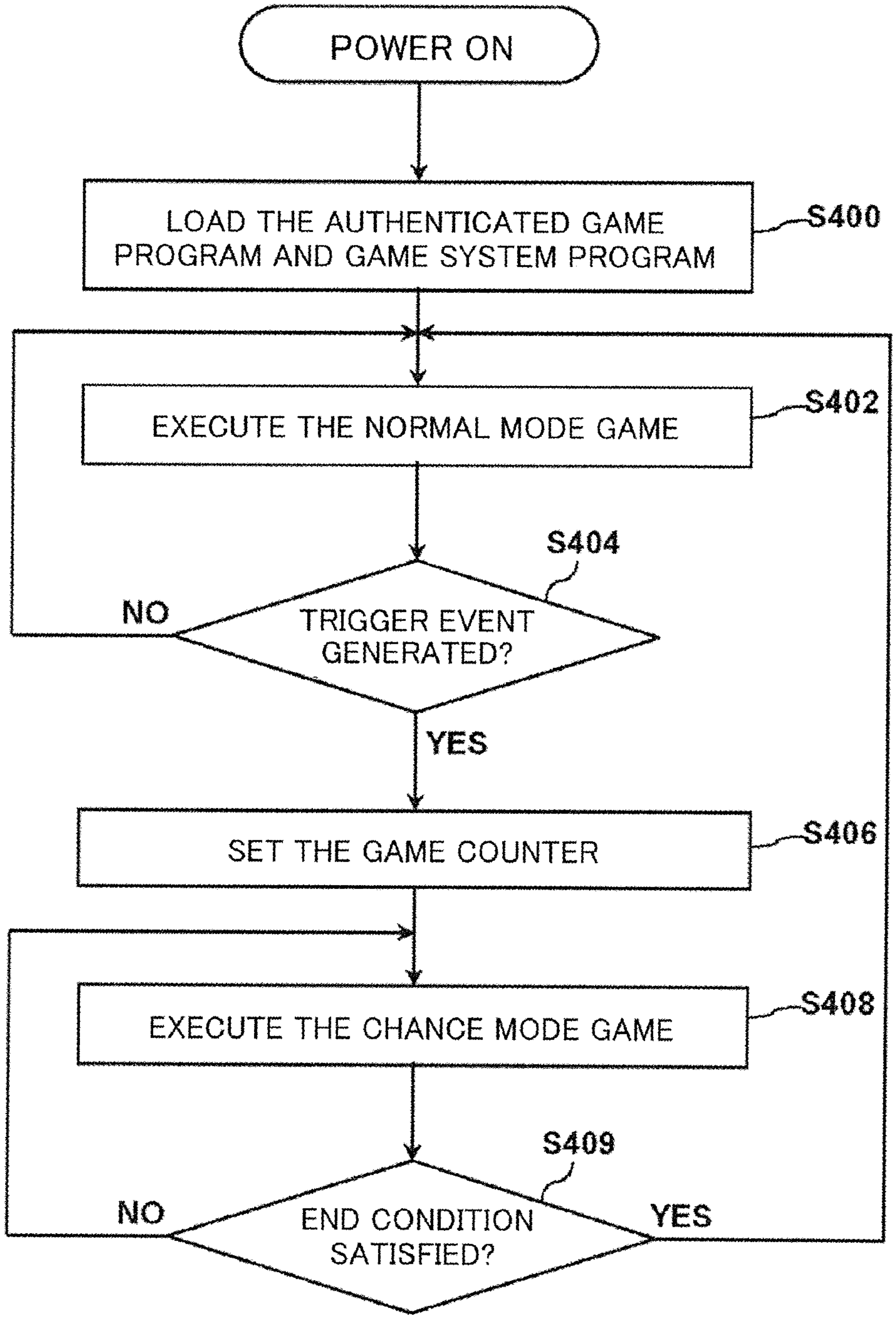
FIG. 15 is a flowchart showing a general process executed in the slot machine according to the present embodiment.

FIG. 15 shows the process executed in the slot machine 10.

When the power is supplied to the slot machine 10, the main CPU 222 loads the authenticated game program and game system program by reading the programs from the memory card 210 through the game board 200 and writing them into the RAM 226 (step S400). Subsequently, the main CPU 222 executes the game program and the game system program.

When the unit game is started by inserting the IC card into the IC card reader 60 or inserting coins into the coin insertion unit 80, the player can execute a new game based on the inserted coins or the stored bets. When the unit game is initially played after starting up the slot machine 10, the game mode goes into the normal mode. Thus, the main CPU 222 executes the normal mode game process for the initial unit game (step S402).

Whenever the normal mode game is completed, the game mode determination process part 316 executed by the main CPU 222 determines whether or not the trigger event occurs (step S404). Unless the trigger event occurs, the game mode of the subsequent game remains in the normal mode. Thus, the main CPU 222 returns the process to step S402 to execute the normal mode game process for the subsequent unit game.

If, however, determining in the determination process at step S404 that trigger event has occurred, the main CPU 20 changes the game mode of the subsequent game to the chance mode.

As mentioned above, in a preferred embodiment, the number of unit games that can be executed in a single session in the chance mode is limited to seven. The symbol code determination tables 341 to 343 are different from one another, and thus can be used for each of the unit games in the chance mode. Whenever each of the unit games in the chance mode is executed, the game counter increases the number of the unit games that has been already executed in the session, or decreases the number of the unit games that remains in the session. In the description below, it is assumed that the game counter increases the number of the unit games that has been already executed from zero. Thus, in the process at step S406, the main CPU 222 sets a game counter to be zero. Afterwards, the main CPU 222 executes the chance mode game process for the subsequent game (step S408).

Each time the unit game in the chance mode is completed, the game mode determination process part 316 determines whether or not the end condition is satisfied (step S409). Unless the end condition is satisfied, the game mode of the subsequent unit game remains in the chance mode. Thus, the main CPU 222 returns the process to step S408 to execute the chance mode game process for the subsequent unit game.

If, however, determining in the determination process at step S409 that the end condition is satisfied, the main CPU 222 returns the game mode of the subsequent unit game to the normal mode. Thus, the main CPU 222 returns the process to step S402 to execute the normal mode game process for the subsequent unit game.

Figure 16:
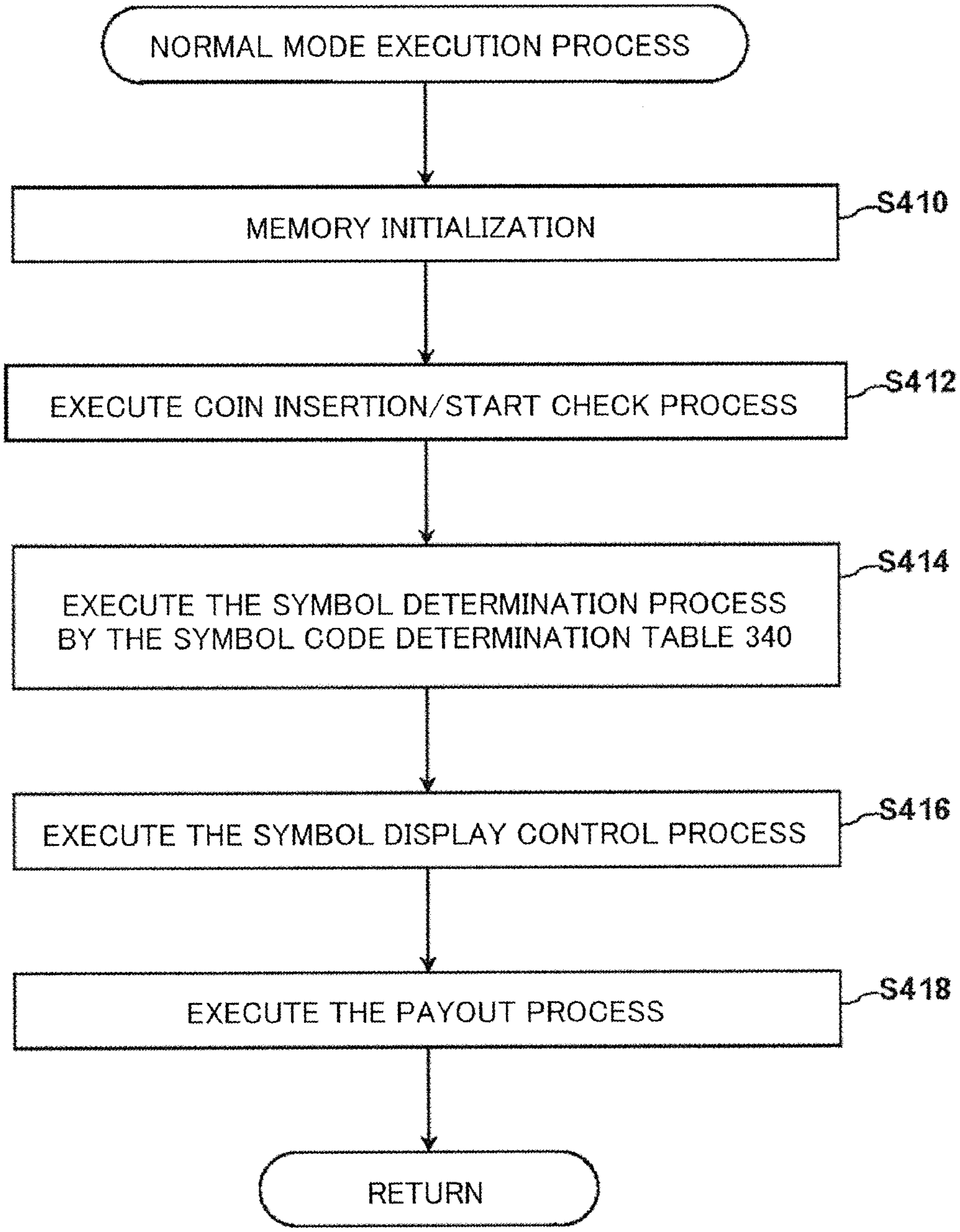
FIG. 16 is a flowchart showing the normal mode gaming process.

FIG. 16 shows the normal mode execution process, which shows step S402 shown in FIG. 15 in detail.

Each time a unit game is completed, the main CPU 222 executes memory initialization process (step S410). In this initialization process, the main CPU 222 clears unnecessary data and information from the temporary working area in the RAM 226. The unnecessary data and information includes the payout data, awarding or failure information, and the to-be-stopped symbol information determined in the previous unit game.

Subsequently, the main CPU 222 executes coin-insertion/start-check process (step S412). In this process, the main CPU 222 checks the entry of coins or bills, and scans inputs from the BET buttons 74 to 78 and the START button 79.

After the START button 79 is pressed by the player, the main CPU 222 executes symbol determination process (step S414). In this process, the main CPU 222 generates five random numbers and determines five symbol codes of five to-be-stopped symbols corresponding to the random numbers with reference to the symbol code determination table 340. The main CPU 222 determines whether or not any winning combination is achieved by the rearranged symbol matrix that is formed of the rearranged symbols.

At step S416, the main CPU 222 executes symbol display control process. In this process, the main CPU 222 controls the reel assembly 50 to rotate the reels 52A to 52E, and then to stop rotating the reels 52A to 52E in order to rearrange the symbols in accordance with the symbol determination result to form the symbol matrix in the display window 56.

Then, at step S418, the main CPU 222 determines the payout amount, and executes the payout process to provide the player with the determined payout amount.

Figure 17:
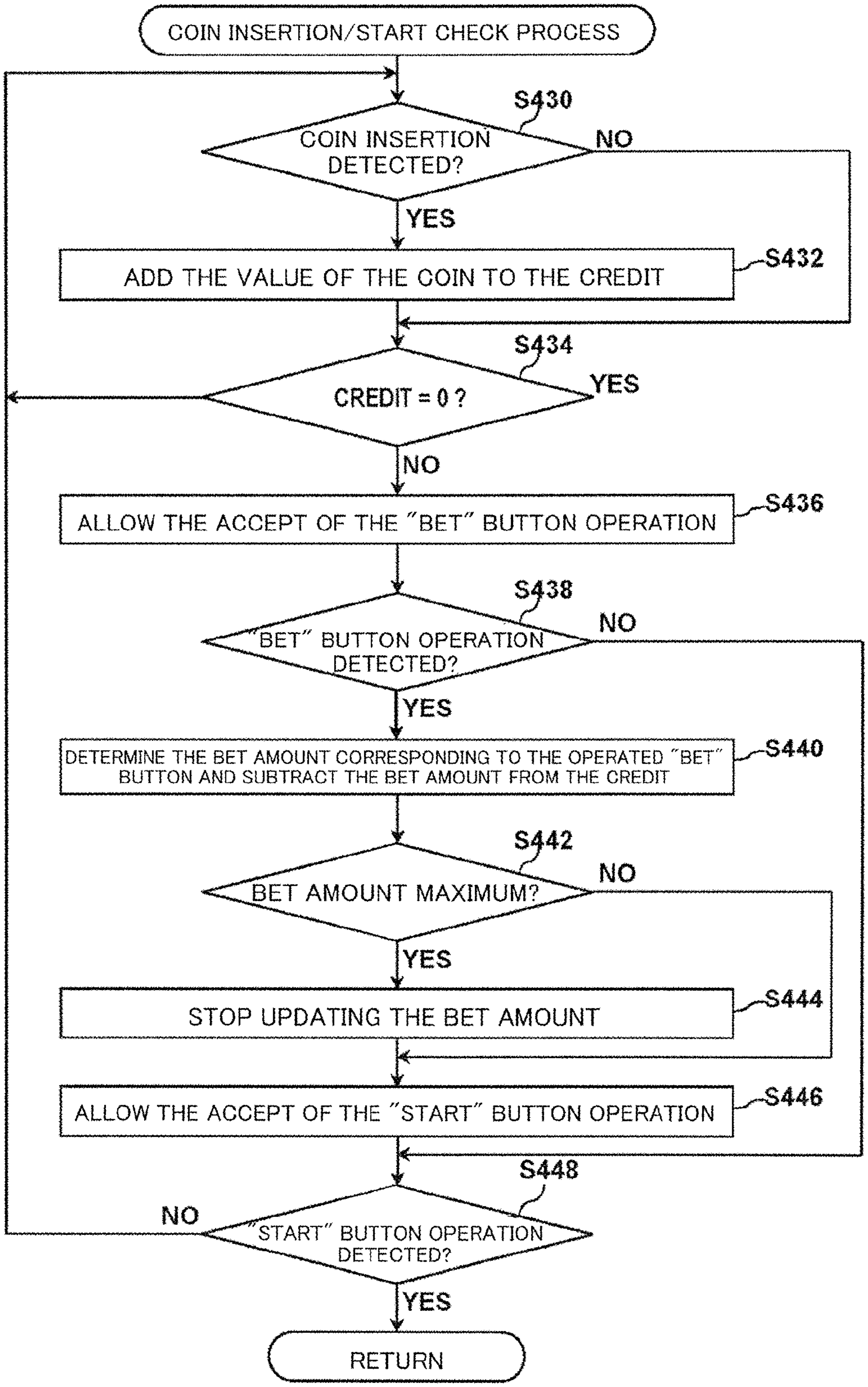
FIG. 17 is a flowchart showing the coin insertion/start check process shown in FIG. 16 in detail.

FIG. 17 shows the coin-insertion/start-check process, which shows the process at step S412 shown in FIG. 16 in detail.

First, the main CPU 222 determines, by means of the input/credit checking process part 300 executed in the main CPU 222, whether or not the coin counter 232 detects insertion of a coin (step S430). When determining at step S430 that a coin has been inserted, the main CPU 222 adds the value of the inserted coin to the credits stored in the RAM 226 (step S432). At this stage, the main CPU 222 may further determine whether or not the bill validator 246 detects insertion of a bill. When determining that a bill has been inserted, the main CPU 222 adds the value of the inserted bill to the credits.

When the process at step S432 has been completed or when it is determined at step S430 that no coin has been inserted, the main CPU 222 determines whether or not the credit amount is zero (step S434). If determining in the determination process at step S434 that there remains some credits, the main CPU 222 allows the bet setting inputs through the BET buttons 34 to 38 up to the remaining credits (step S436). If determining in the determination process at step S434 that there remains no credit, the main CPU 222 returns the process to step S430.

Afterwards, main CPU 222 monitors the bet setting input through the BET buttons 74 to 78 based on bet setting input signals output from the bet switches 74S to 78S (step S438). If the main CPU 222 determines that any of the BET buttons 74 to 78 has been pressed by the user, the main CPU 222 adjusts the betting amount value stored in the RAM 226 according to the pressed BET button, and subtracts the betting amount from the credit value stored in the RAM 226 (step S440). If determining in the determination process at step S434 that there is no BET button input for a predetermined time, the main CPU 222 proceeds the process to step S448.

During the increase of the betting amount, the main CPU 222 determines whether or not the betting amount reaches a predetermined maximum value (step S442). When the betting amount has reached the predetermined maximum value, the main CPU 222 prohibits any further increase of the betting amount (step S444).

Upon completing the process at step S444 or determining that betting amount has not reached the maximum value in the process at step S442 and the betting amount is adjusted, the main CPU 222 allows the operation input through the START button 79 (step S446). At this stage, the main CPU 222 can display the set pay lines the symbol display unit.

In the process at step S448, the main CPU 222 determines whether or not the input through the START button 79 is detected (step S448). When the input from the START button 79 has not been detected for a predetermined standby time, the main CPU 222 returns the process to step S430. If determining in the process at step S448 that the input from the START button 79 has been detected, the main CPU 222 terminates the coin-insertion/start-check process.

<<Symbol Determination Process>>

Figure 18:
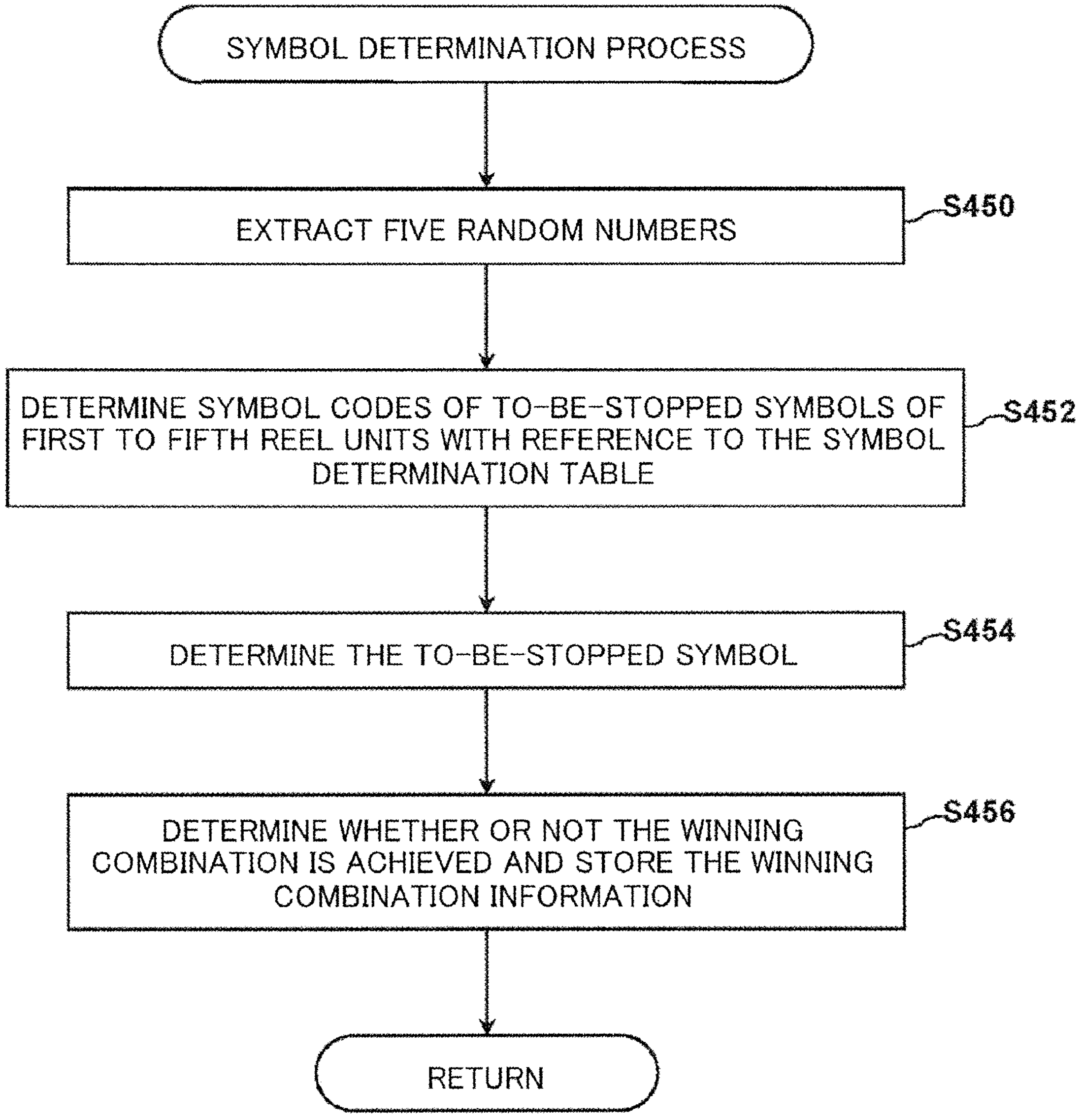
FIG. 18 is a flowchart showing the symbol determination process shown in FIG. 16 in detail.

FIG. 18 shows the symbol determination process, which shows step S414 shown in FIG. 16 in detail.

First, the random number generation process part 302 executed by the main CPU 222 extracts five random numbers (step S450).

Subsequently, the symbol determination process part 304 executed by the main CPU 222 determines first to fifth symbol codes using the first to fifth random numbers, respectively, with reference to the symbol code determination table 340 (step S452). Then, the main CPU 222 determines first to fifth to-be-stopped symbols corresponding to the first to the fifth symbol codes, respectively, with reference to the symbol code table, as shown in FIG. 7 (step S454). As a result, the five to-be-stopped symbols are determined by use of the five random numbers. Upon determination of the first to fifth to-be-stopped symbols, the main CPU 222 stores the symbols or symbol codes in the RAM 226.

The five to-be-stopped symbols are symbols to be stopped at the second row of each column of the symbol matrix shown in FIG. 9. Since the symbol alignments constituting the first to fifth symbol columns are fixed corresponding to each of the reels 52A to 52E, determining the to-be-stopped symbols determines all the symbols constituting the symbol matrix. The main CPU 222 determines all the symbols constituting the symbol matrix based on the to-be-stopped symbols with reference to the symbol code table of FIG. 7.

Afterwards, the winning determination process part 310 executed by the main CPU 222 determines whether or not any winning combination is achieved by the symbols constituting the symbol matrix determined in the process at step S456 (step S456). In case that a winning combination is achieved by the symbols constituting the symbol matrix, the winning determination process part 310 stores the winning combination in the RAM 226 (step S456). In addition, the main CPU 222 may determine whether or not the winning combination is achieved from the symbol codes of to-be-stopped symbols without determining whether or not the winning combination is achieved using the symbol matrix.

Finally, the symbol determination process terminates and the execution flow returns to the main process (not shown).

<<Symbol Display Control Process>>

Figure 19:
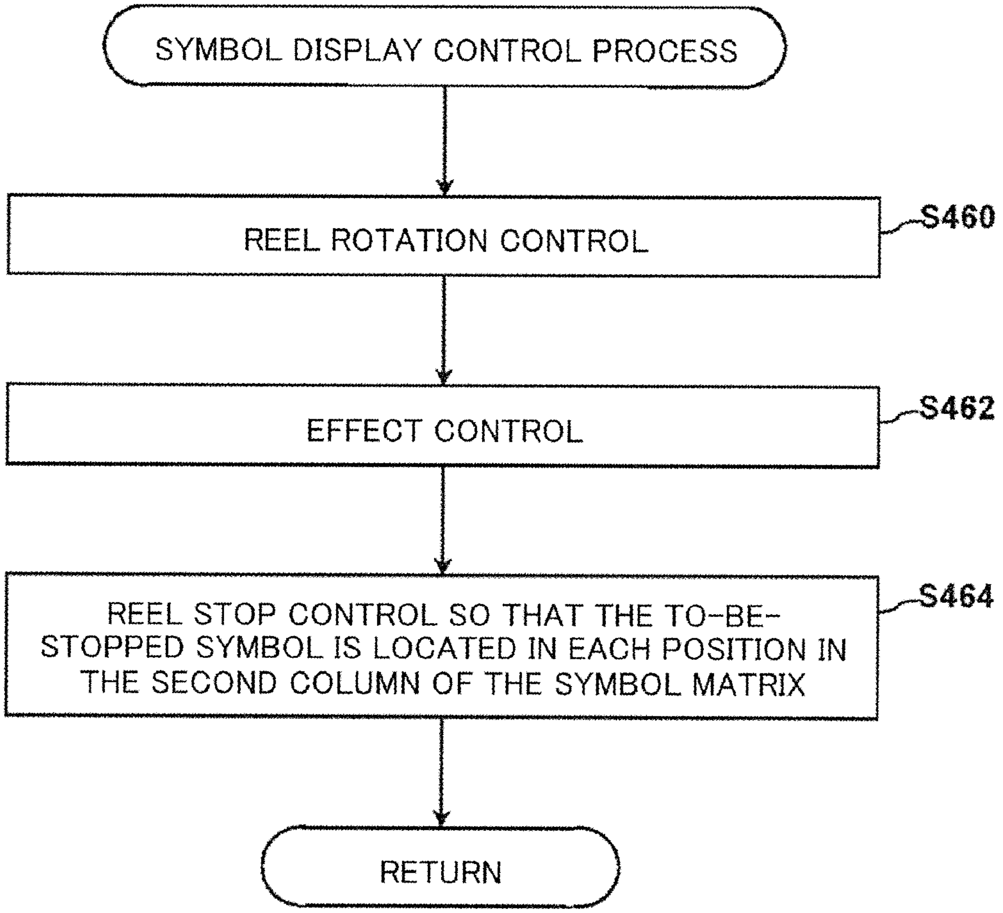
FIG. 19 is a flowchart showing the symbol display control shown in FIG. 16 in detail.

FIG. 19 shows the symbol display control process, which shows step S416 shown in FIG. 16 in detail.

First, the reel control process part 308 executed by the main CPU 222 transmits a spin control signal to the reel assembly 50 so that the reel driver 264 of the first to fifth reels 52A to 52E supplies power to the reel motor 272 to spin the reels. Each of the first to fifth reels 52A to 52E rotates at the speed different from one another, and the symbol alignment provided on the reels 52A to 52E scrolls in the display window 56 of the symbol display unit 40 (step S460).

While the first to fifth reels 52A to 52E rotates, the backlight driver 266 supplies power to the light sources 282 of the backlight device 280 and the effect illumination driver 268 supplies power to the light source 292 of the effect light illumination device 290 to execute the effect from behind the reel surfaces.

The spin control signal contains information of stop positions of the reels 52A to 52E. The reel driver 264 of the reels 52A to 52E controls the reel motors 272 to stop the reels 52A to 52E at the position indicated by the spin control signal. Thus, the reel motors 272 composed of stepping motors is stopped at desired positions, and the scroll of the symbol columns is stopped so that the to-be-stopped symbols are arranged in the second row of the symbol matrix formed in the display window 56 (step S464).

Finally, the symbol display control process terminates and the execution flow returns to the main function.

<<Payout Process>>

Figure 20:
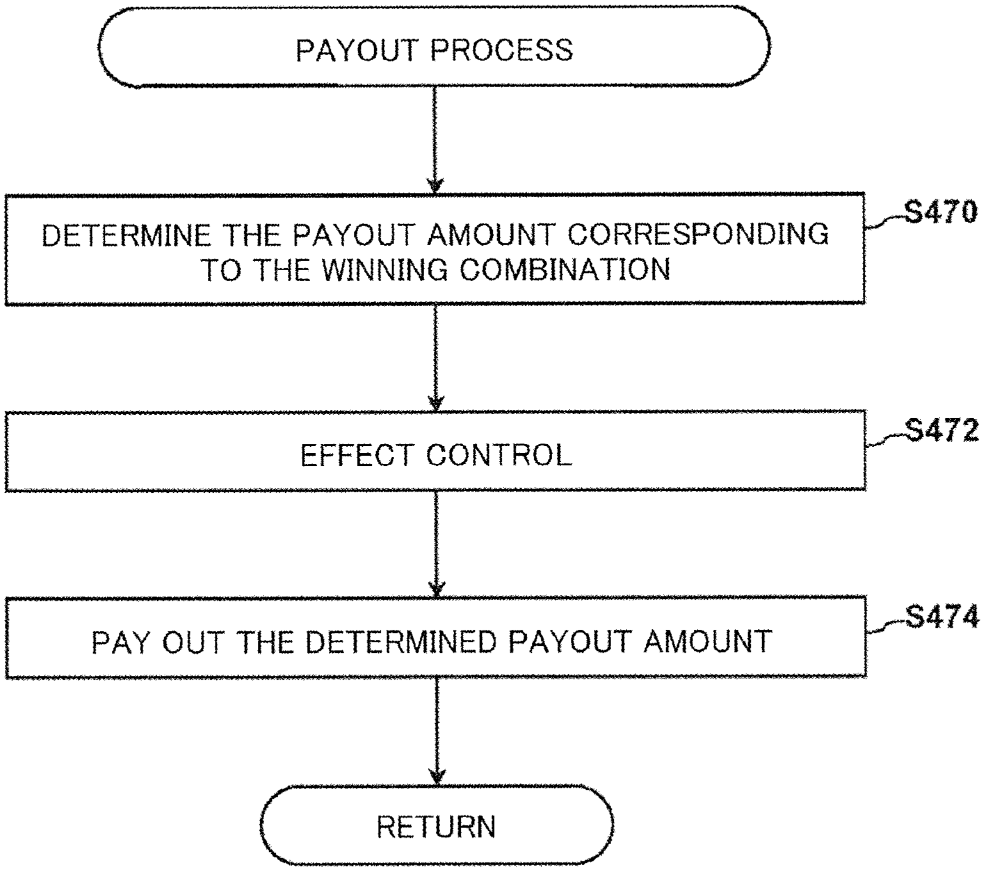
FIG. 20 is a flowchart showing the payout process shown in FIG. 16 in detail.

FIG. 20 illustrates the payout process, which shows step S418 shown in FIG. 16 in detail.

When a winning combination is achieved, the winning determination process part 310 or the payout process part 314 executed by the main CPU 222 determines the payout amount corresponding to the winning combination and stores the amount in the RAM 226 (step S470).

As soon as the reels 52A to 52E stop, the effect control process part 312 executed by the main CPU 222 controls the symbol display unit 40 and the other devices, such as the speaker 112, the lamp 114 and the video display unit 110, to execute the effects (step S472). The production effect includes video, audio effect, backlight change, and illumination effect.

Afterwards, the payout process part 314 pays out the determined amount by increasing the credits or discharging coins to the coin tray 92 (step S474).

<<Chance Mode Execution Process>>

In the present embodiment, a free game is executed as the game in the chance mode. Accordingly, in the game in the normal mode, the unit game is started based on the fact that the BET operation is carried out by a player. In contrast, in the game in the chance mode, the unit game can be started without carrying out the BET operation by a player.

The term "free game" refers to the game in which a player can have a chance to acquire the game value without paying or consuming the game value. For example, that is the game in which the unit game can be executed without inserting a coin or a credit into the slot machine 10, so that the coin and the credit cannot be consumed even if the game resultingly ends in failure. In this manner, the game in the chance mode being as the free game enables the player to get a chance to acquire the game values without consuming the game values such as coins and credits.

Figure 21:
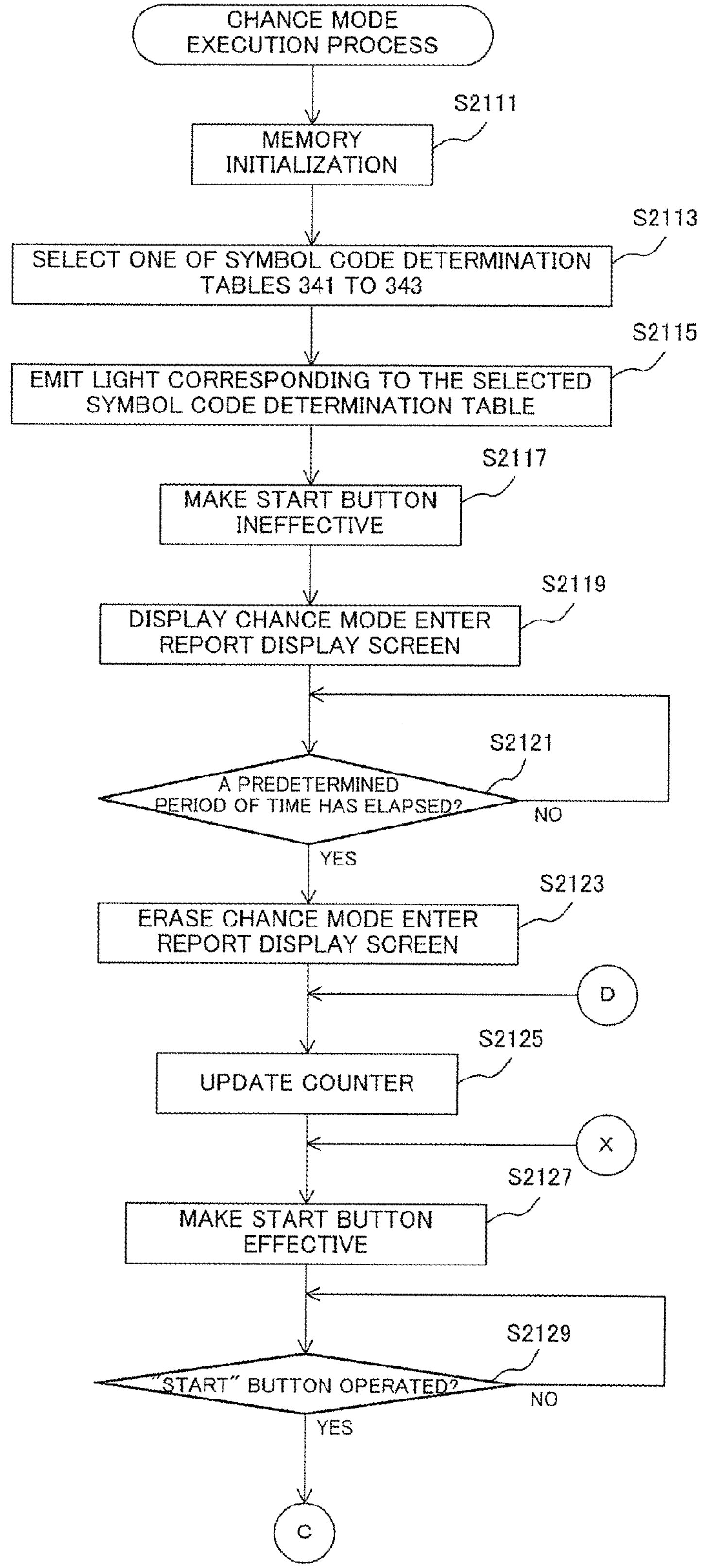
FIG. 21 is a flowchart showing the chance mode gaming process.

FIGS. 21 and 22 are flow charts showing the processing for executing the game in the chance mode. The process is invoked and executed in the chance mode game processing shown in FIG. 15 (step S408).

Whenever proceeding to the chance mode, the main CPU 222 executes the memory initialization process (step S2111). The main CPU 222 clears unnecessary data and information from the temporary working space of the RAM 226. The unnecessary data and information includes, for example, the payout data, awarding or failure information, and the to-be-stopped symbol information determined in the previous unit game.

Then, the main CPU 222 determines one of the symbol code determination table from among the symbol code determination tables 341 to 343 at random (step S2113). In this process, it is preferable to generate the random number and select one of the three symbol code determination tables 341 to 343 corresponding to the value of the generated number.

Then, the main CPU 222 lights backlights of the five reels 52A to 52E with a color corresponding to one of the symbol code determination tables selected in the process at step S2113 (step S2115). Driving the backlight driver 266 described above can light the backlight with the color corresponding to the symbol code determination table. For example, the backlight lights in red when the symbol code determination table 341 is selected. The backlight lights in yellow when the symbol code determination table 342 is selected. The backlight lights in blue when the symbol code determination table 343 is selected.

Although the example described above shows the case where the backlight is lighted with the color corresponding to the selected symbol code determination table, the other lamp may be lighted, a predetermined image may be displayed with the color corresponding to the display, or an image corresponding thereto may be displayed. What is necessary is that the process at step S2115 is the process capable of visibly showing a player one of the symbol code determination tables selected in the process at step S2113.

In this manner, the way of display is diversified according to the selected symbol code determination table, so that a player can imagine a variety of reasons so as to be caught in the game. Furthermore, it is possible to give feelings of expectation and tension to a player who has already known the way of display.

Then, the main CPU 222 makes the "START" button 79 ineffective (step S2117). Thus, the unit games do not start even if the player operates the "START" button 79.

Then, the CPU 222 displays a chance mode enter report display screen on the video display unit 110 (step S2119). For example, a large "Sapphire CHANCE!!" letters and a large sapphire symbol are displayed. The appearance of the "SAPPHIRE" symbol thus enables the player to recognize the entering to the chance mode.

Furthermore, as shown in FIG. 33, letters "Up to 7 FREE GAMES" may also be displayed under the chance mode enter report display screen. This enables the player to recognize that the chance mode games are the free games composed of seven unit games. The unit games being executed for seven times can raise expectations of the player. Furthermore, the chance mode game being the free game makes it possible to recognize that the games can start without BET operation. Also, since the game can be played without consuming the credits, it is possible to raise expectations of the player further.

As described above, such display can give the player recognition that the game mode enters from the normal mode into the chance mode. In particular, since the symbols do not start scrolling until a predetermined period of time has elapsed even if the "START" button 79 is operated, the player can be prevented from misidentifying the slot machine 10 as being out of order by explicitly demonstrating the chance mode enter report display screen on the video display unit 110.

Then, the main CPU 222 determines whether or not a predetermined period of time has elapsed (step S2121). Upon determining that the predetermined period of time has not elapsed (NO), the main CPU 222 returns the process to step S2121.

Upon determining that the predetermined period of time has elapsed (YES), the main CPU 222 erases the chance mode enter report display screen displayed in the process at step S2119 from the video display unit 110 (step S2123). This enables the player to visibly recognize that the games in the chance mode can be started.

Then, the main CPU 222 increments the count value of the game counter which indicates the serial number of the chance mode games to be executed (step S2125). Since the count value of the game counter is initialized to be zero by means of the process at step S2111, the count value of the game counter is set to 1 in the initial (first) chance mode game.

It is preferable that an effect image is displayed on the video display unit 110 in accordance with the count value when the count value is updated in the process at step S2125. In this way, it is possible to show the player the progress of the chance mode games, and thus to give the player feelings of expectation and tension.

Then, the main CPU 222 makes the "START" button 79 effective (step S2127). Due to the execution of the process described above, the player cannot operate the "START" button 79 until the predetermined period of time has elapsed. Therefore, the unit games do not start although the player operates the "START" button 79, the player can recognize that the game mode enters from the normal mode into the chance mode.

In particular, since the player cannot start playing the unit games although he/she overlooks the letters "CHERRY CHANCE!!" displayed on the video display unit 110, the player can recognize that the game mode enters from the normal mode into the chance mode. As described above, the player can recognize that the game mode proceeds from the normal mode to the chance mode by both the effect on the video display unit 110 and the progress of the unit games on the symbol display unit 40.

Then, the main CPU 222 determines whether or not the "START" button 79 is operated by the player (step S2129). Upon determining that the "START" button 79 is not operated by the player (NO), the main CPU 222 returns the process to step S2129.

Upon determining that the "START" button 79 is operated by the player (YES), the main CPU 222 executes the symbol determination process (step S2211). In this process, the symbol code determination table selected in the process at step S2113 is used. More specifically, the main CPU 222 first generates five, namely first to fifth, random numbers. Then, the main CPU 222 determines first to fifth symbol codes using the first to fifth random numbers with reference to the selected symbol code determination tables 341 to 348, respectively.

The first random number is the random number for determining a symbol code of a to-be-stopped symbol in the first symbol column. The second random number is the random number for determining a symbol code of a to-be-stopped symbol in the second symbol column. The third random number is the random number for determining a symbol code of a to-be-stopped symbol in the third symbol column. The fourth random number is the random number for determining a symbol code of a to-be-stopped symbol in the fourth symbol column. The fifth random number is the random number for determining a symbol code of a to-be-stopped symbol in the fifth symbol column.

Then, the main CPU 222 executes the process to rearrange the symbols (step S2213). The process of rearranging the symbols causes the scroll of the first to fifth symbol columns to be started, and then stops the scroll of the first to fifth symbol columns after a predetermined period of time has elapsed. At that time, the symbol matrix of three rows and five columns is rearranged in the display window 56 so that the symbols of five symbol codes (to-be-stopped symbols)

determined in the process at step S2211 appear in the second column in the display window 56 (the second column in the symbol matrix formed in the display window 56).

Then, the main CPU 222 determines whether or not a predetermined winning combination is achieved by the rearranged symbol matrix, and pays out the payout amount corresponding to the achieved winning combination when the predetermined winning combination is achieved (step S2215).

Then, the main CPU 222 determines whether or not the value of the counter is seven (step S2217). The value of the counter indicates the number of times of the chance mode games in that session. For example, if the value of the counter is three, it indicates that the third chance mode game is executed in that session. The determination process at step S2217 is the process for determining whether or not the seventh chance mode game is executed, i.e., the last chance mode game is executed in that session. More specifically, the chance mode is terminated and then the mode returns to the normal mode upon satisfying the end condition of the chance mode.

Upon determining that the value of the counter is seven (YES) in the determination process at step S2217, the main CPU 222 terminates the subroutine.

On the other hand, upon determining that the value of the counter is not seven (NO) in the determination process at step S2217, the main CPU 222 determines whether or not more than three "7" symbols appear in one of the pay lines.

Upon determining that more than three "7" symbols appear in one of the pay lines (YES), the main CPU 222 initializes the value of the counter, e.g., sets it to zero, and then returns the process to the above-mentioned step S2127. In this manner, it is possible to discontinue the chance game in the current session and then start afresh the chance games in the next session from the first game. In this way, the chance game is not simply added, but the current chance game is terminated so as to start afresh the chance game. It is thus possible to limit the number of games that a player can play.

Shifting the session from the current session to the next one enables the games to be played in a row. More specifically, the chance games can be played in a row by executing the chance games in a plurality of sessions.

Upon determining that more than three "7" symbols do not appear in one of the pay lines (NO), the main CPU 222 returns the process to step S2125 described above. In this way, it is possible to continuously carry out the chance games in the current session.

As described above, the process at step S2113 selects a symbol code determination table from among the symbol code determination tables 341 to 343 at random. The symbol code determination table 341 is the table in which the number of times of the free games to be executed in a row is determined to be about 4.5 times (the probability of executing the games in a row is 82%). The symbol code determination table 342 is the table in which the number of times of the free games to be executed in a row is determined to be about 3.0 times (the probability of executing the games in a row is 75%). The symbol code determination table 343 is the table in which the number of times of the free games to be executed in a row is determined to be about 2.0 times (the probability of executing the games in a row is 67%). In this way, a plurality of symbol code determination tables is selected at random, so that the average number of times of the free games in a row can be specified to a desired number of times. It is thus possible to achieve the balance between the benefit that a casino can obtain and the benefit given to a player.

The symbol code determination tables 341 to 343 are the tables which are specified so that the symbol "7" is selected with a certain probability in each of the first to seventh chance games. On the other hand, the tables may be used each of which is specified so that the symbol "7" is selected in each of the first to seventh chance games with the probabilities different from one another. For example, the symbol code determination table 341 is composed of seven tables, namely the symbol code determination tables 341(1) to 341(7). In this way, when the symbol code determination table 341 is selected in the process at step S2113, the symbol code determination table 341(1) is selected in the first chance game, and then five random numbers, i.e., the first to fifth random numbers are generated to determine the first to fifth symbol codes. The symbol code determination table 341(2) is selected in the second chance game, and then five random numbers, i.e., the first to fifth random numbers, are generated to determine the first to fifth symbol codes. In this manner, the symbol code determination tables to be used are changed in turn from the table 341(1) to the table 341(7) with increase in the number of the chance games.

For example, when the probability of appearance of the symbol "7" is set to become gradually lower in order from the symbol code determination tables 341(1) to 341(7), the games can be difficult to be played in a row as the chance games progress. It is thus possible to give a player the feelings of expectation and tension.

Likewise, the symbol code determination table 342 is also composed of seven tables, i.e., the symbol code determination tables 342(1) to 342(7). The symbol code determination table 343 is also composed of seven tables, i.e., the symbol code determination tables 343(1) to 343(7).

The probability of appearance of the symbol "7" may be set to become gradually higher or to be random as the chance games progress.

<<<Overview of Chance Mode>>>

The appearance of the "SAPPHIRE" symbol in the normal mode makes the mode enter into the chance mode. Entering into the chance mode first provides a player with seven free games. If more than three "7" symbols appear one of the pay lines before reaching the seventh free game, the play is terminated at the current free game, and then seven free games are given anew. For example, when more than three "7" symbols appear in one of the pay lines in the third free game, the free games are temporarily terminated without completing the remaining four free games, and then seven free games are started anew from the first free game. If more than three "7" symbols do not appear in one of the pay lines by the end of seven free games, the chance mode is terminated and then the mode returns to the normal mode.

In the conventional chance mode, free games are simply added when a predetermined condition is established in the chance mode. In contrast, in the free games in the chance mode according to the present embodiment, when a predetermined condition is established in the chance mode, the current free game is temporarily terminated, and then next free games are started afresh from the first free game. This can prevent an excessive benefit from being given to a player, and the benefit to the parlor such as a casino can be ensured. Furthermore, the limited number of free games given to a player makes it possible to give a player an appropriate feeling of tension. Moreover, since the number of free games is limited, it is possible to easily change the status from being difficult to consume the game media (the chance mode) to being easy to consume the game media (the normal mode).

<<<Modification>>>

The process at step S2113 in FIG. 21 described above has shown the case where a symbol code determination table is determined from among three symbol code determination tables 341 to 343 at random. In this way, the symbol code determination table may be determined not only at random but corresponding to the history of the game.

For example, a payout rate is calculated as the history of the game each time the unit game ends so as to store it in the RAM 226. If the payout rate is included between the first payout rate and the second payout rate, the symbol code determination table 342 is selected. More specifically, if the payout rate is included between the first payout rate and the second payout rate, the payout rate is regarded as that desired by the casino, so that the symbol code determination table 342 is selected in which the number of free games to be executed in a row is an average number of times.

If the payout rate is higher than the first payout rate, the symbol code determination table 343 is selected. More specifically, if the payout rate is higher than the first payout rate, the payout rate is regarded as one higher than that desired by the casino, so that the symbol code determination table 343 is selected in which the lower number of free games is to be executed.

If the payout rate is lower than the first payout rate, the symbol code determination table 341 is selected. More specifically, if the payout rate is lower than the first payout rate, the payout rate is regarded as one lower than that desired by the casino, so that the symbol code determination table 343 is selected in which the higher number of the free games is executed.

In this way, the symbol code determination table is selected corresponding to the payout rate so as to limit the number of free games to be executed in a row, so that it is possible to achieve the balance between the benefit for a player and the benefit for a casino.

In addition, although the example described above uses the payout rate as the history of the game, other information may be used. For example, the number of times of the mode change entering into the chance mode and the number of times of the free games to be executed in a row may be used.

Furthermore, although the example described above shows the case where a single symbol code determination table is determined in the process at step S2113 in FIG. 21 and that symbol code determination table is continuously used until the chance mode ends, the symbol code determination table may be determined while the chance mode is going on. In this way, the symbol code determination table can be changed even while the chance mode is going on and the free games are being executed in a row.

For example, the symbol code determination table may be determined each time the unit game is started in the chance mode, i.e., with each unit game. Furthermore, the symbol code determination table may be determined only when the first free game starts afresh upon executing the free games in a row. Moreover, a symbol code determination table may be determined from among three symbol code determination tables 341 to 343 after it is determined at random whether or not the symbol code determination table is determined and then determined that the symbol code determination table is going to be determined.

Also in such a case, the determination of the symbol code determination table may be determined at random, or may be determined corresponding to the history of the game (such as the payout rate, the number of times of the mode change entering into the chance mode, the number of times of the free games to be executed in a row, etc.)

Furthermore, in the process at step S2121 in FIG. 21 described above, the "START" button 79 has been inactivated (step S2117) and the chance mode enter report display screen has been displayed on the video display unit 110 (step S2119) until the predetermined period of time has elapsed. The predetermined period of time is a constant period of time for any players. However, that may be the period of time in which a player who is playing the game over a long time or a skilled player cannot play the game further and can do nothing but waiting therefor. Thus, it is favorable to change the predetermined period of time depending on the player. More specifically, if it is determined that the player is one who is playing the game over a long time or a skilled one, the predetermined period of time is shortened. This enables the chance mode games to be immediately executed, and thus the availability can be enhanced.

In order to determine whether or not the player is one who is playing the game over a long time or a skilled one, the period of time between the unit games is continuously measured. It can thus be determined that the player is changed to the other one when longer time is spent between the unit games than the predetermined period of time. Moreover, in case that the player's identification information can be acquired by means of, for example, a PTS (Player Tracking System), it is possible to determine whether or not the player is a changed one or a skilled one in accordance with the change of the identification information, the contents of the identification information, etc.

Furthermore, so-called scatter symbols are prevented from appearing in the chance mode games. The scatter symbols are the symbols that appear regardless of the pay lines upon a plurality of symbols being rearranged. The payout amount is determined in accordance with the number of the appeared scatter symbols. The payout amount of the scatter symbols is generally small because it may be inappropriate in the chance mode games. In addition, if the scatter symbols with large amount of payout are specified, the scatter symbols may appear in the chance mode games.

Although the so-called mechanical reels 52A to 52E are used in the example described above, the structure using video reels may be employed.

What is claimed is:

1. A gaming machine capable of obtaining a game result based on a plurality of rearranged symbols, comprising:

a symbol display unit for rearranging the plurality of symbols;

a memory having a first determination table for causing a plurality of symbols to appear on the symbol display unit in a first game mode with a first probability, the first game mode being to execute a first game, and a second determination table for causing a plurality of symbols to appear on the symbol display unit in a second game mode with a second probability, the second game mode being to execute a second game;

a value-addition mechanism configured to receive a first physical item associated with a monetary value by which a player is able to add to the gaming machine credits to be bet;

an award payout mechanism by which a second physical item associated with a monetary value can be paid out to the player or credited to current credits of the player as an outcome of the first or second game; and a controller for, as a result of the player having bet credits, executing processes of:

switching the first game mode into the second game mode and executing the second game under the condition that a predetermined condition is satisfied in the first game mode;

terminating the second game mode under the condition that a number of unit games executed in the second game of a current session reaches a predetermined number in the second game mode; and discontinuing the second game of the current session and starting the second game of a new session under the condition that the number of unit games executed in the second game of the current session is less than the predetermined number and a predetermined symbol appears on the symbol display unit in the second game of the current session.

2. The gaming machine according to claim 1, wherein:

the second determination table includes a plurality of determination tables having probabilities different from one another; and switching the first game mode into the second game mode includes selecting a determination table from among the plurality of determination tables included in the second determination table at random.

3. The gaming machine according to claim 2, wherein switching the first game mode into the second game mode further includes:

reporting information on the determination table that is selected from among the plurality of determination tables included in the second determination table.

4. A gaming machine capable of obtaining a game result based on a plurality of rearranged symbols, comprising:

a symbol display unit for rearranging the plurality of symbols;

a memory having a first determination table for causing a plurality of symbols to appear on the symbol display unit in a first game mode with a first probability, the first game mode being to execute a first game, and a plurality of second determination tables for causing a plurality of symbols to appear on the symbol display unit in a second game mode, the plurality of second determination tables having probabilities different from one another, and the second game mode being to execute a second game;

a value-addition mechanism configured to receive a first physical item associated with a monetary value by which a player is able to add to the gaming machine credits to be bet;

an award payout mechanism by which a second physical item associated with a monetary value can be paid out to the player or credited to current credits of the player as an outcome of the first or second game; and a controller for, as a result of the player having bet credits, executing processes of:

switching the first game mode into the second game mode under the condition that a predetermined condition is satisfied in the first game mode;

selecting a second determination table from among the plurality of second determination tables at random upon switching the first game mode into the second game mode;

reporting information on selected one of the second determination tables;

initializing a number of executed unit games upon switching the first game mode into the second game mode;

starting the second game of a current session;

counting the number of executed unit games in the second game of the current session;

terminating the second game mode under the condition that the number of games reaches a predetermined number in the second game mode;

discontinuing the second game of the current session under the condition that the number of executed unit games in the second game of the current session is less than the predetermined number and a predetermined symbol appears on the symbol display unit in the second game of the current session;

initializing the number of executed unit games after discontinuing the second game of the current session; and starting the second game of a new session after executing initializing the number of executed unit games.

* * * * *